(12) United States Patent
Ellis et al.

(10) Patent No.: US 7,744,331 B2
(45) Date of Patent: Jun. 29, 2010

(54) TRANSPORT VEHICLE AND METHOD

(75) Inventors: Jeffrey D. Ellis, Wetwyn Garden (GB); Stephen Morris-Jones, Welwyn (GB)

(73) Assignee: Xerox Corporation, Norwalk, CT (US)

( * ) Notice: Subject to any disclaimer, the term of this patent is extended or adjusted under 35 U.S.C. 154(b) by 1191 days.

(21) Appl. No.: 11/340,108

(22) Filed: Jan. 26, 2006

(65) Prior Publication Data

US 2007/0169977 A1 Jul. 26, 2007

(51) Int. Cl.
*B60P 1/00* (2006.01)

(52) U.S. Cl. ................... 414/476; 414/469; 414/813; 414/921; 180/8.2; 180/9.28; 280/5.22

(58) Field of Classification Search ............ 414/469, 414/476, 813, 921; 180/8.2, 9.28; 280/5.2, 280/5.22
See application file for complete search history.

(56) References Cited

U.S. PATENT DOCUMENTS

| | | | |
|---|---|---|---|
| 5,335,741 A * | 8/1994 | Rabinovitz et al. ............ 180/8.2 |
| 5,641,030 A * | 6/1997 | Toselli ........................ 180/9.32 |
| 5,701,965 A | 12/1997 | Kamen et al. |
| 5,791,425 A | 8/1998 | Kamen et al. |
| 5,971,091 A | 10/1999 | Kamen et al. |
| 5,975,225 A | 11/1999 | Kamen et al. |
| 6,062,600 A | 5/2000 | Kamen et al. |
| 6,223,104 B1 | 4/2001 | Kamen et al. |
| 6,288,505 B1 | 9/2001 | Heinzmann et al. |
| 6,302,230 B1 | 10/2001 | Kamen et al. |
| 6,311,794 B1 | 11/2001 | Morrell et al. |
| 6,332,103 B1 | 12/2001 | Steenson, Jr. et al. |
| 6,343,664 B2 | 2/2002 | Morrell et al. |
| 6,357,544 B1 | 3/2002 | Kamen et al. |
| 6,367,817 B1 | 4/2002 | Kamen et al. |
| 6,386,576 B1 | 5/2002 | Kamen et al. |
| 6,405,816 B1 | 6/2002 | Kamen et al. |
| 6,408,240 B1 | 6/2002 | Morrell et al. |
| 6,415,879 B2 | 7/2002 | Kamen et al. |
| 6,443,250 B1 | 9/2002 | Kamen et al. |
| 6,443,251 B1 | 9/2002 | Morrell et al. |
| 6,538,411 B1 | 3/2003 | Field et al. |
| 6,543,564 B1 | 4/2003 | Kamen et al. |
| 6,547,026 B2 | 4/2003 | Kamen et al. |
| 6,553,271 B1 | 4/2003 | Morrell |
| 6,561,294 B1 | 5/2003 | Kamen et al. |
| 6,571,892 B2 | 6/2003 | Kamen et al. |
| 6,575,539 B2 | 6/2003 | Reich |
| 6,581,714 B1 | 6/2003 | Kamen et al. |
| 6,598,941 B2 | 7/2003 | Field et al. |
| 6,615,938 B2 | 9/2003 | Morrell et al. |
| 6,651,763 B1 | 11/2003 | Kamen et al. |
| 6,651,766 B2 | 11/2003 | Kamen et al. |

(Continued)

OTHER PUBLICATIONS

Definition (3) of flexible from http://yourdictionary.com/flexible.*

*Primary Examiner*—Michael S Lowe
(74) *Attorney, Agent, or Firm*—Fay Sharpe LLP

(57) ABSTRACT

A transport vehicle includes a self-balancing vehicle base. A platform is supported on the base and is displaceable relative thereto between a first position and a second position. A support device engages the platform and supports at least a portion thereof during displacement between the first position and the second position. A method is also included.

27 Claims, 21 Drawing Sheets

U.S. PATENT DOCUMENTS

| | | |
|---|---|---|
| 6,715,845 B2 | 4/2004 | Kamen et al. |
| 6,779,621 B2 | 8/2004 | Kamen et al. |
| 6,789,640 B1 | 9/2004 | Arling et al. |
| 6,796,396 B2 | 9/2004 | Kamen et al. |
| 6,799,649 B2 | 10/2004 | Kamen et al. |
| 6,815,919 B2 | 11/2004 | Field et al. |
| 6,827,163 B2 | 12/2004 | Amsbury et al. |
| 6,866,107 B2 | 3/2005 | Heinzmann et al. |
| 6,868,931 B2 | 3/2005 | Morrell et al. |
| 6,874,591 B2 | 4/2005 | Morrell et al. |
| 6,915,878 B2 | 7/2005 | Kamen et al. |
| 6,929,080 B2 | 8/2005 | Kamen et al. |
| 6,969,079 B2 | 11/2005 | Kamen et al. |
| 2001/0026756 A1 * | 10/2001 | Mortimore .................. 414/556 |
| 2002/0063006 A1 | 5/2002 | Kamen et al. |
| 2003/0146025 A1 | 8/2003 | Kamen et al. |
| 2004/0011573 A1 | 1/2004 | Kamen et al. |
| 2004/0055795 A1 | 3/2004 | Kamen et al. |
| 2004/0055796 A1 | 3/2004 | Kamen et al. |
| 2004/0055804 A1 | 3/2004 | Kamen et al. |
| 2004/0069543 A1 | 4/2004 | Kamen et al. |
| 2004/0183272 A1 | 9/2004 | Kamen et al. |
| 2005/0017733 A1 | 1/2005 | Heinzmann et al. |
| 2005/0034553 A1 | 2/2005 | Kamen et al. |
| 2005/0121866 A1 | 6/2005 | Kamen et al. |
| 2005/0126832 A1 | 6/2005 | Amsbury et al. |
| 2005/0236215 A1 | 10/2005 | Kamen et al. |

* cited by examiner

FIG. 8
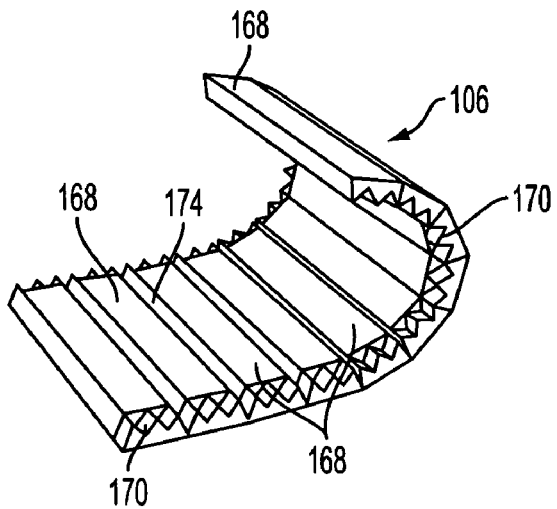
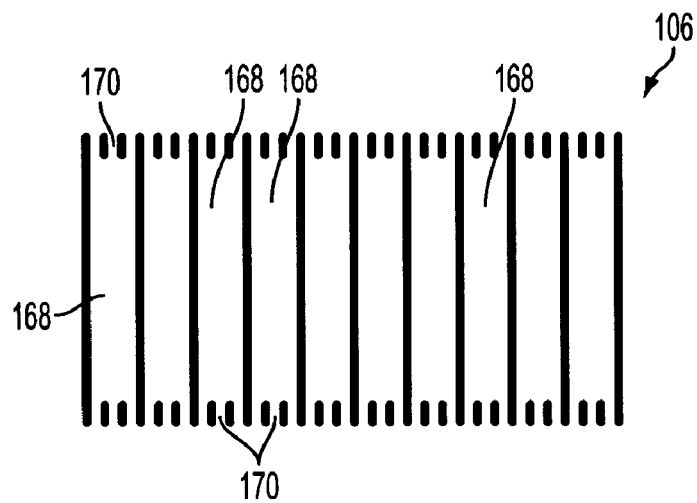
FIG. 9
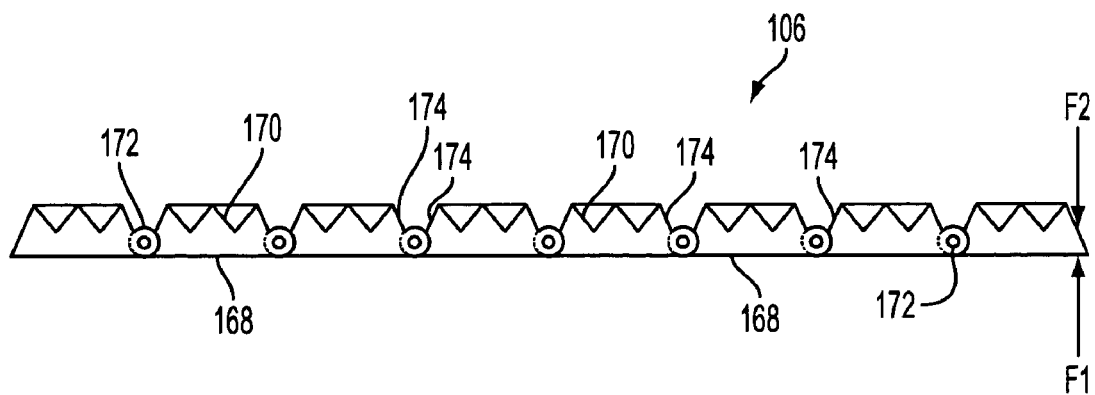
FIG. 10

TRANSPORT VEHICLE AND METHOD

BACKGROUND

The subject disclosure broadly relates to the art of transport vehicles and, more particularly, to a self-balancing vehicle suitable for transporting an associated cargo or payload over an uneven or discontinuous surface and a method of transporting the associated cargo using the same.

The subject matter of the present disclosure is capable of broad application and can be used in association with the transport of any suitably sized and/or weighted payloads, such as kitchen appliances, business or office equipment, and industrial machinery, for example. The subject matter of the present disclosure finds particular use and application in association with the transport of copy machines, printers, and sensitive and/or sophisticated equipment of other types and kinds, and specific reference is made herein with regard thereto. However, it is to be understood that the specific applications and uses shown and discussed herein are merely exemplary and that the same are not intended to be in any way limiting.

The current practice of transporting larger pieces of office equipment, such as copy machines and stand alone or network printers, for example, normally involves at least some amount of lifting and/or lowering the equipment. This is typically performed by delivery or service persons using manual physical effort. In many cases, such office equipment is loaded onto a two-wheeled cart or dolly and tilted back so that the weight of the equipment is carried on the two wheels of the cart. Even so, current practices of transporting such equipment and systems undesirably require substantial physical effort on the part of the transporting personnel, two or more of whom are often dispatched to transport the equipment.

Another disadvantage of current methods is that the complex and sophisticated equipment that is often being transported is usually unavoidably caused to experience certain undesirable conditions during transport. As an example, tilting a copy machine or printer on a two-wheeled dolly for transport often results in the spillage of toner and other consumables, which can negatively impact the performance and/or output of the equipment. Additionally, the machines and/or equipment often also experience undesirable loads or inputs during transport. This can be due to starting, stopping, bumps and other occurrences, which can impart impact loads on sensitive components. These types of inputs can result in further spillage of consumables, and can also cause components to deviate from pre-calibrated conditions or even become damaged.

What's more, both the physical difficulty and the magnitude of these undesirable inputs and conditions are greatly increased where the transport path involves traversing a discontinuous surface, such as a flight of stairs, for example. This situation is common in countries, including many European countries, in which older buildings that do not have elevators or lifts remain in use as residential, commercial or industrial buildings into which such equipment is commonly delivered.

It will be appreciated that the extent to which such inputs will be problematic for a given cargo will depend upon the type, kind and/or configuration of the product that is being transported. For example, complex and highly sensitive devices, such as electrophotographic equipment (e.g., copy machines and printers) can be subject to significant damage, such as component breakage, misalignment, loss of calibration and consumable spillage (e.g., toner spillage), for example, due to even minimal impact and other undesirable inputs. Whereas, less sophisticated equipment, such as kitchen appliances and industrial machinery, for example, may be less susceptible to issues such as misalignment, loss of calibration and spillage. However, these types of equipment and machinery too can benefit from improved handling and reduced impact loading, such as to minimize chipping and scratching of finished components, for example.

Devices have been developed that reduce the amount of the physical labor required to transport a piece of equipment up flights of stairs. Such devices commonly include an otherwise typical two-wheeled dolly or handcart that has powered endless belts disposed along the back support structure of the cart. In use, the transport personnel lean the dolly backward (along with the piece of equipment thereon) so that the powered track lays on and engages the stair treads. The powered track can then be energized such that the endless belt(s) assist in carrying the dolly and the equipment thereon up the stairs.

One difficulty with such arrangements, however, is that the dolly must be physically manipulated at the top and the bottom of each flight of stairs as well as being negotiated by hand around each landing therebetween. Thus, substantial physical effort remains, even with the benefit of the powered track. Another disadvantage is that such devices still require the equipment to be tilted or tipped. As such, the spilling and/or leakage of consumables remains an issue. Furthermore, to aid in engaging the stair treads, the endless belt(s) are often outfitted with grips or protrusions to catch on the tread. Unfortunately, the pitch or spacing of the grips is often different than the spacing of the stairs. In such cases, the use of the powered track can result in shock loads or inputs occurring at nearly each step. Thus, even with the use of the powered track to reduce the physical effort involved, shock loads and other undesirable inputs still unavoidably occur.

Further still, self-balancing devices have been developed that are well suited for transporting human beings over a variety of surface conditions. Such devices are disclosed in U.S. Pat. Nos. 6,288,505; 6,302,230; 6,357,544; 6,367,817; 6,408,240; 6,538,411; 6,543,564; 6,561,294; 6,598,941; 6,651,763; 6,651,766; 6,779,621; 6,789,640; 6,796,396; 6,815,919; 6,827,163; 6,868,931; 6,874,591; 6,929,080 and 6,969,079; and U.S. Patent Publication Nos. 20020063006; 20030146025; 20040011573; 20040055795; 20040055796; 20040055804; 20040069543; 20050017733; 20050121866; 20050126832 and 20050236215, all of which are incorporated herein by reference in their entireties. It will be appreciated that these transport devices are generally not well suited for traversing a discontinuous surfaces, such as a flight of stairs.

However, other transporting devices are known that can traverse discontinuous surfaces and can generally perform such tasks with a minimum of tipping or tilting and while undergoing few impacts, shock loads or other such undesirable inputs. Examples of such devices are shown a in U.S. Pat. Nos. 5,701,965; 5,791,425; 5,971,091; 5,975,225; 6,223,104; 6,311,794; 6,332,103; 6,343,664; 6,405,816; 6,415,879; 6,443,250; 6,443,251; 6,553,271; 6,571,892; 6,575,539; 6,581,714; 6,615,938; 6,715,845; 6,799,649; 6,866,107 and 6,915,878; and U.S. Patent Publication Nos. 20040183272 and 20050034553, all of which are incorporated herein by reference in their entireties. It will be recognized, however, that these self-balancing devices have largely been developed for use in transporting human beings and generally take the form of wheeled chairs. As such, there are numerous aspects of these devices which generally limit their application to human transport, and which substantially reduce the effectiveness of these devices for transporting equipment and other inanimate payloads.

One significant example of such an aspect relates to the ability of a human being to mount and dismount these known devices. That is, these self-balancing devices have been developed to remained generally upright under essentially all operational conditions. Accordingly, the human user typically mounts and dismounts (alone or with assistance) such a self-balancing device while the same is in a generally upright orientation. In some cases, the self-balancing device may be angled forward slightly to assist the user. However, tilting such a self-balancing transporter beyond a certain maximum angle can undesirably result in a cantilevered load condition that is outside the capability of the self-balancing transporter to correct. Issues related to such conditions, and devices for preventing the occurrence of such conditions or mitigating the effects thereof are disclosed in the. U.S. Pat. Nos. 6,062, 600; 6,386,576; and 6,547,026. As such, a generally upright orientation is normally maintained. As a result, such self-balancing devices are not well-suited for transferring (e.g., loading and/or unloading) relatively large and/or heavy objects, such as office equipment, for example, on to and off of the self-balancing devices.

BRIEF DESCRIPTION

A transport vehicle in accordance with the present disclosure is provided that includes a self-balancing vehicle base and a platform supported on the base. The platform is displaceable relative to the base between a first position and a second position. A support device engages the platform and supports at least a portion thereof during displacement between the first position and the second position.

A vehicle in accordance with the present disclosure for transporting an associated cargo over a discontinuous surface is provided that includes a self-balancing vehicle base operative to traverse a discontinuous surface. The self-balancing vehicle base is displaceable between a first orientation for transporting the associated cargo and a second orientation for transferring the associated cargo. A platform is supported on the vehicle base for receiving the associated cargo. The support platform is displaceable between a retracted position for transporting the associated cargo and an extended position for transferring the associated cargo. A support member extends between the vehicle base and the platform, and is operative to support the platform during displacement between the retracted position and the extended position.

A transport vehicle in accordance with the present disclosure that is capable of traversing a plurality of stairs carrying an associated payload is provided that includes a self-balancing vehicle base including a base structure having opposing sides. An axis extends between the opposing sides, and a base axle extends along the axis. A motor is an operative association with the base axle. First and second carrier members are supported along the opposing sides of the base structure for rotation about the axis. At least one of the first and second carrier members is operatively associated with the base axle. The first and second carrier members have opposing ends and a wheel axle supported on each of the opposing ends. A wheel assembly is supported on each of the wheel axles. A platform is supported on the vehicle base and is displaceable between a first position and a second position. A flexible force transmitting device is supportable on the platform and is adapted to engage one of the vehicle base or at least one of the wheel assemblies on at least one of the first and second carrier members.

A method of transporting a payload in accordance with the present disclosure is provided that includes providing a self-balancing vehicle base, a displaceable platform supported on the vehicle base, and a support device. The method also includes moving the vehicle base from a first angular orientation to a second angular orientation, and moving the platform from a first position to a second position. The method further includes transferring the payload to or from the platform, returning the platform to the first position, and returning the vehicle base to the first angular position.

BRIEF DESCRIPTION OF THE DRAWINGS

FIG. 8 is a perspective view of one exemplary embodiment of a support device shown in a partially flexed condition.

FIG. 9 is a top view of the support device in FIG. 8 shown in an extended condition.

FIG. 10 is a side view of the support device in FIGS. 8 and 9 shown in an extended condition.

DETAILED DESCRIPTION

Figure 1:
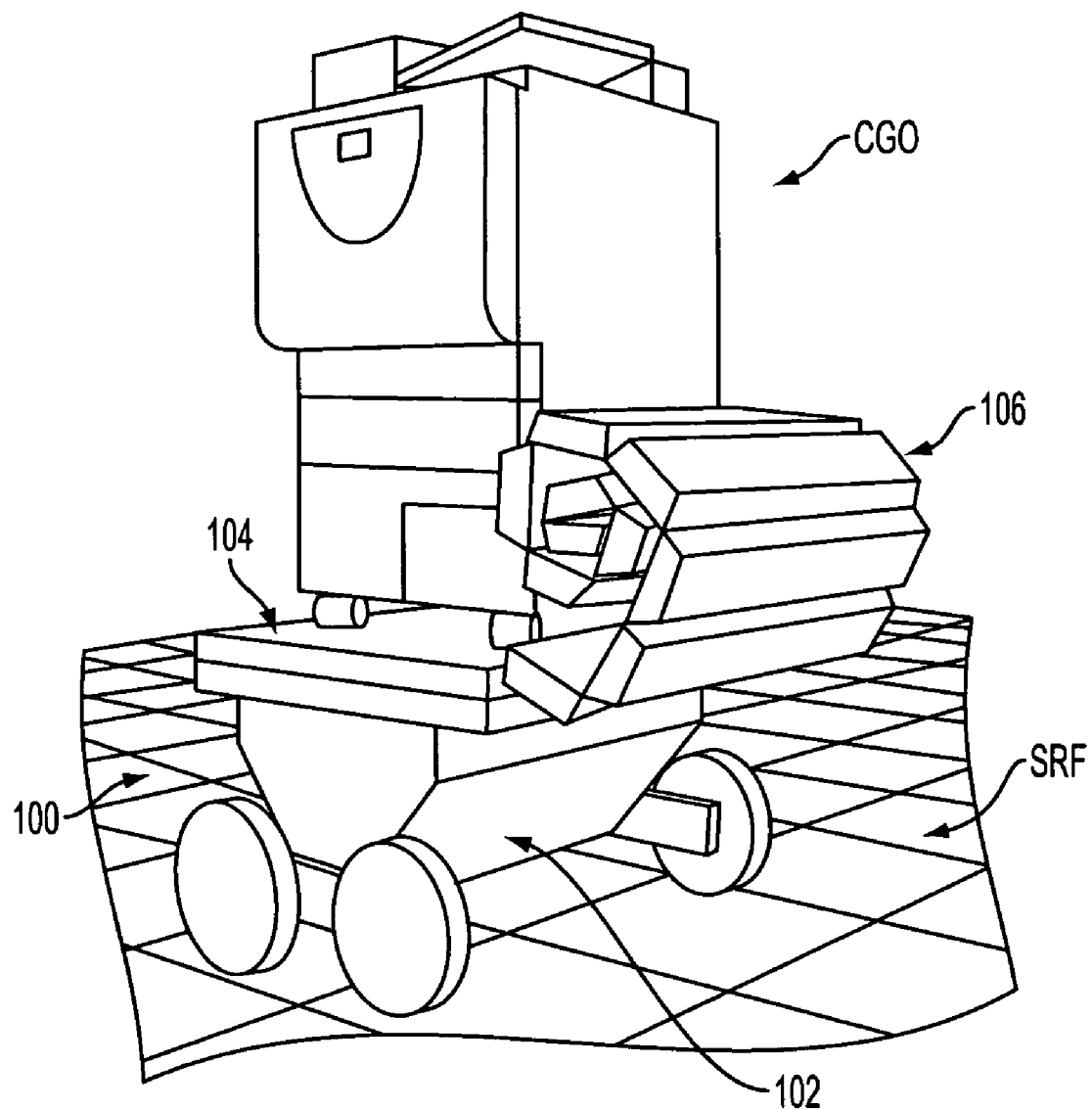
FIG. 1 is a perspective view of one exemplary embodiment of a vehicle base, platform and support member shown in use transporting an associated payload on a surface.

With reference to FIG. 1, a transporter or transport vehicle 100 is shown transporting an associated payload or cargo CGO, which is illustrated in the drawings as being in an electrophotographic device (e.g., a copying machine or printer), on, across or along a surface SRF. It will be appreciated, however, that associated cargo of any type, kind or configuration can alternately be transported, such as kitchen appliances or industrial machinery, for example.

Transport vehicle 100 is suitable for movement along and across substantially continuous surfaces, which can include any indoor or outdoor surfaces, such as ground surfaces, sidewalks, driveways, roadways, parking lots as well as interior floor surfaces. Additionally, such surfaces can be disposed at any reasonable incline or orientation, such as interior or exterior building access ramps, for example. Furthermore, transport vehicle 100 is suitable for traversing discontinuous surfaces, such as climbing roadway or parking lot curbs and ascending/descending flights of stairs, for example. One example of a device suitable for such operation is available from Independent Technologies LLC of Endicott, N.Y. under the designation IBOT Mobility System. It will be appreciated, however, that IBOT Mobility Systems are primarily designed and used for human transport, as discussed above in detail, and that these devices are not believed to be suitable the transport of relatively large or heavy cargo. This is due, at least in part, to issues discussed above involving the loading and unloading of cargo.

Figure 2:
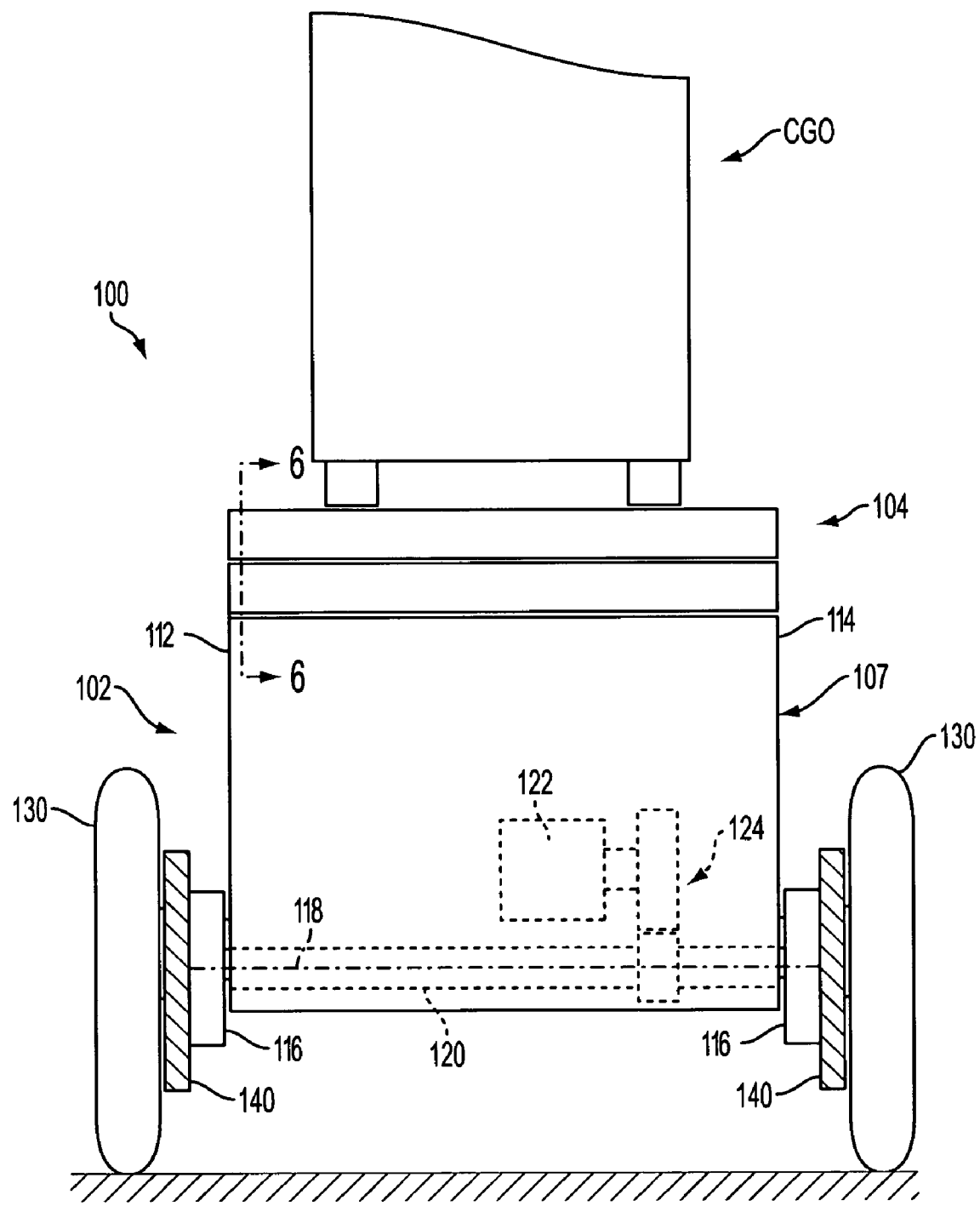
FIG. 2 is a front view of the vehicle base and platform in FIG. 1.
Figure 3:
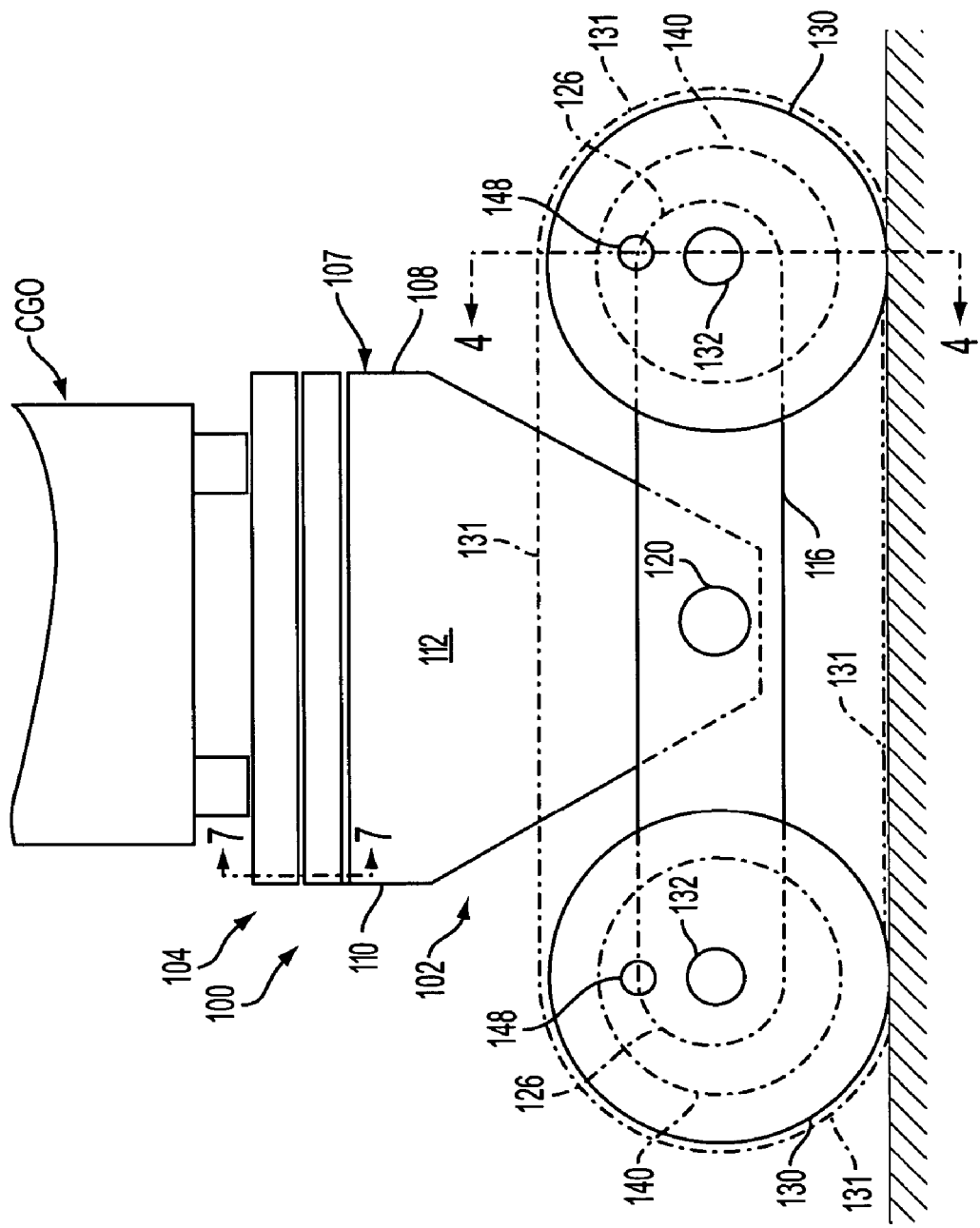
FIG. 3 is a side view of the vehicle base and platform in FIGS. 1 and 2.
Figure 4:
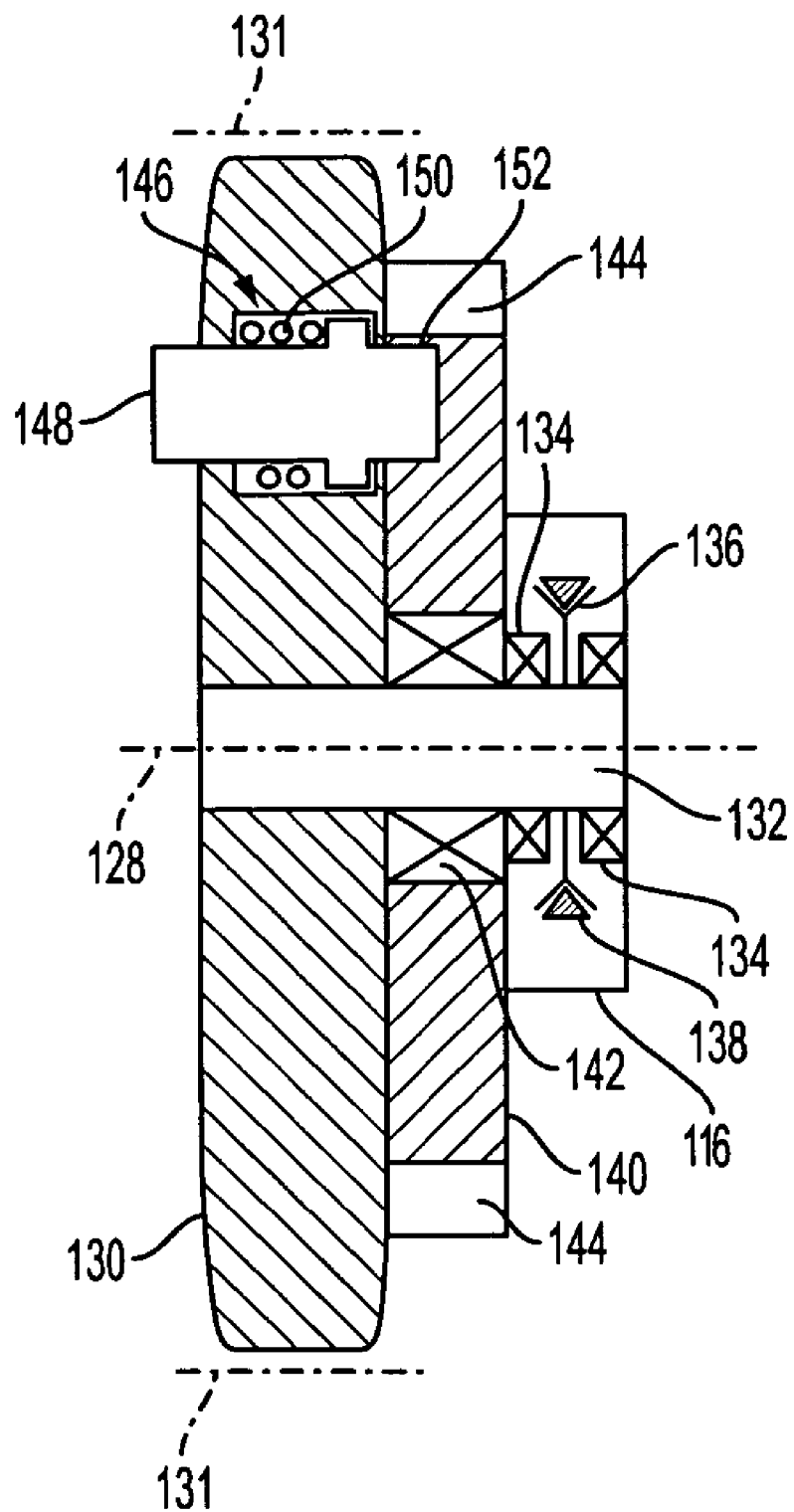
FIG. 4 is a cross-sectional view of a wheel and carrier member taken along line 4-4 in FIG. 3.

Transport vehicle 100 includes a vehicle base 102, a cargo or support platform or platform assembly 104 supported on the vehicle base, and a support device, such as a flexible force transmission device 106, for example. FIGS. 2 and 3 illustrate transport vehicle 100 in use transporting cargo CGO on a surface SRF without a support device, which can optionally be removed when not in use as will be discussed in additional detail hereinafter. Vehicle base 102 includes a base structure 107 having a front 108, a rear 110 and opposing sides 112 and 114. Carrier members 116 are supported on opposing sides 112 and 114 of vehicle base 102 in a manner suitable for rotation about a base axis 118 that extends between the opposing sides. Vehicle base 102 includes a base axle 120 extending along base axis 118 and a motor 122 operative to drive axle 120, such as through a suitable transmission 124, for example. Vehicle base 102 also includes one or more ground-engaging components, such as an endless drive track or wheel, for example, operatively associated with carrier members 116. In the present exemplary embodiment, axle 120 approximately centrally engages carrier members 116, which have opposing end portions 126. The carrier members have a wheel axis 128 (FIG. 4) disposed along the end portions that are in approximate alignment with base axis 118. Wheels 130 are supported on end portions 126 of carrier members 116 for rotation about axes 128. Wheels 130 can be suitable for engaging a ground or floor surface, or alternately can operate as hubs for an endless drive track 131, which can optionally be used, as shown in FIGS. 3 and 4.

Wheels 130 can be supported on the carrier members in any suitable manner. For example, in the exemplary embodiment shown in FIG. 4, wheel 130 is rotatably supported along wheel axis 128 on a shaft 132 that is secured on carrier member 116 using suitable friction-reducing components, such as bearings 134. Preferably, at least one of the ground-engaging components is a driven component that is capable of inducing and/or resisting motion of the vehicle base. In the exemplary embodiment in FIG. 4, a drive assembly, such as a pulley 136 and a belt 138, for example, is operatively associated with shaft 132 to drive wheel 130. It will be appreciated, however, that pulley 136 and belt 138 are merely exemplary of a suitable drive assembly, and that any other type or kind of transmission can alternately be used. Power can be provided to the ground-engaging components by way of the drive assembly from any suitable motive power source, such as from a motor or other suitable device. For example, motive power can be transmitted from motor 122 on the vehicle base 102, from a separate (i.e., different) motor located on the vehicle base, or from one or more separate motors located on other components, such as on the corresponding carrier member, for example.

Transport vehicle 100 utilizes a support device, such as flexible force transmission device 106, for example, to support at least a portion of platform 104. Depending upon the type, kind and/or configuration of support device that is used, one or more corresponding features or components may be provided on the vehicle base and/or platform for operative association with the support device. In the present exemplary embodiment, flexible force transmission device 106 is being used. As such, vehicle base 102 includes otherwise optional engagement members suitable for operative association with the support device, which in this case is flexible force transmission device 106. In the present exemplary embodiment, the engagement member is a substantially circular member or engagement disk 140 that is rotatably supported adjacent wheel 130 in a suitable manner, such as by being supported on shaft 132 using a friction-reducing component, such as a bearing 142, for example. Engagement disk 140 also includes one or more engagement features suitable for contacting or otherwise engaging at least a portion of the flexible force transmission device. For example, the one or more engagement features can include a plurality of teeth 144 disposed on or along the periphery of the engagement disk. It will be appreciated, however, that any other suitable configuration or arrangements can alternately used.

In at least one use condition it will be desirable to have engagement disk 140 be substantially freely rotatable on shaft 132 relative to wheel 130. In at least one other use condition, it will be desirable to have engagement disk 140 be registered or indexed to wheel 130 so that the wheel and the engagement disk are operative as an approximately unitary or single assembly. One example of a suitable arrangement for indexing the wheel and the engagement disk is shown in FIG. 4 as a keying assembly 146, which is supported on a wheel 130 and includes a retractable keying pin 148 and a suitable biasing device, such as a spring 150. Engagement disk 140 includes a passage or recess 152 suitable for receiving keying pin 148. In the arrangement shown, keying pin 148 is biased toward engagement disk 140 and normally engages recess 152. Keying pin 148 can be selectively retracted and optional the retained in the retracted position to permit free rotation of engagement disk 140 relative to wheel 130. It will be appreciated, however, that the embodiments shown and described are merely exemplary and that any other suitable device, assembly or arrangement can alternately be used.

Platform or platform assembly 104 is supported on base structure 107 of vehicle base 102 and includes a first or upper platform 154. In the present exemplary embodiment, upper platform 154 is displaceably supported on a second or lower platform 156, which is secured on base structure 107. In the alternative, however, upper platform 154 could be displaceably supported directly on the base structure 107 or in any other suitable manner or arrangement. Upper platform 154 is shown in a first or home position in FIGS. 1-3 that is approximately centered on vehicle base 102. Such an arrangement is well suited for transporting a payload or cargo CGO in a stable and balanced manner on the vehicle base.

One or more actuators or actuating components of any suitable type or kind can be used to selectively displace upper platform 154 relative to lower platform 156 and/or base structure 107. As shown in the exemplary embodiment in FIGS. 5-7, two actuating assemblies 158 can be used. The actuating assemblies can include threaded members 160 rotatably supported on or along lower platform 156, and travel nuts 162 displaceable along the threaded members. Upper platform 154 is pivotally secured on travel nuts 162 as indicated by arrows PVT. As such, by selectively rotating the threaded members, the travel nuts can be displaced therealong and thereby provide motion to platform 154, such as to move between a retracted position and an extended position or other intermediate positions.

Figure 5:
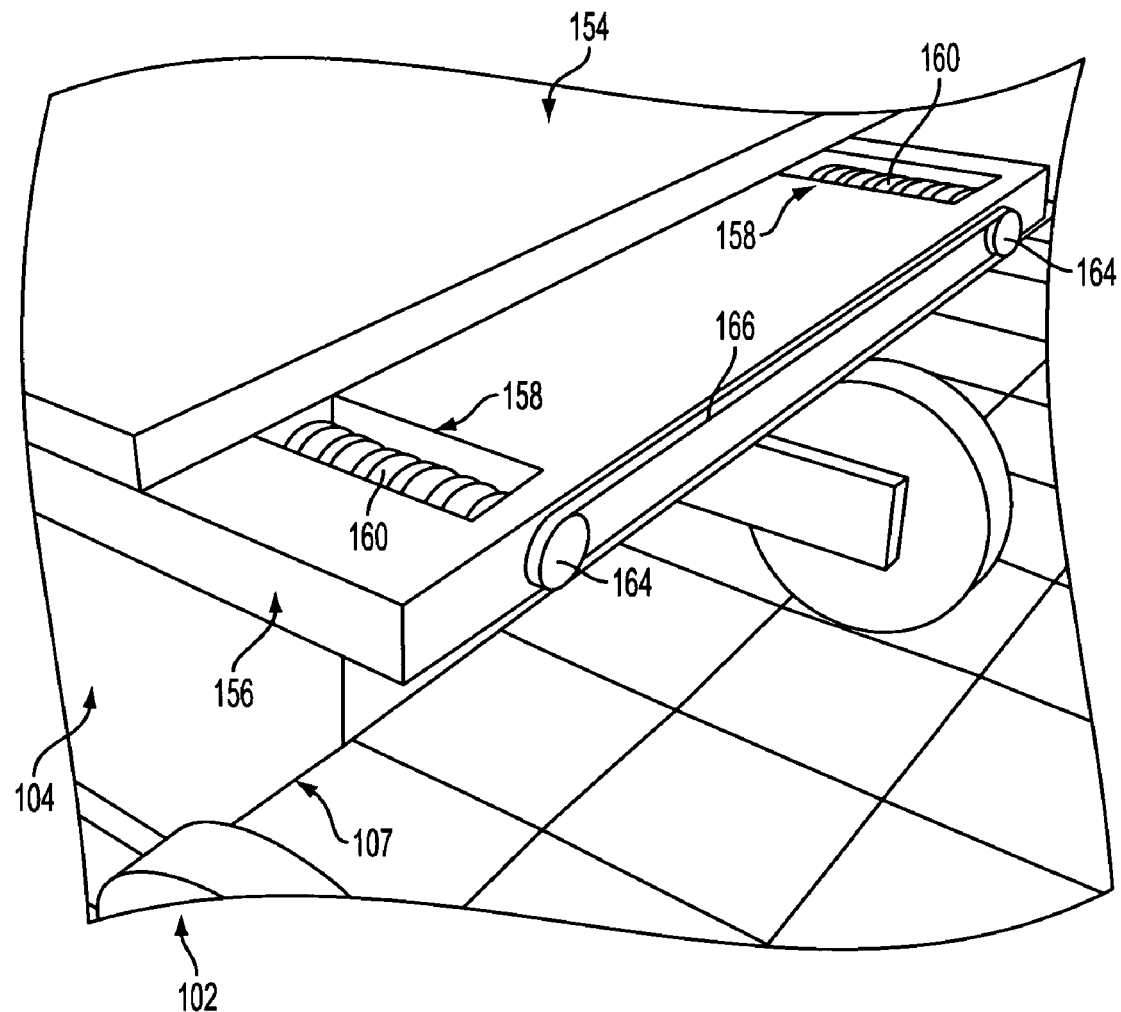
FIG. 5 is a perspective view of the platform in FIGS. 1-3 shown in an intermediate position.
Figure 6:
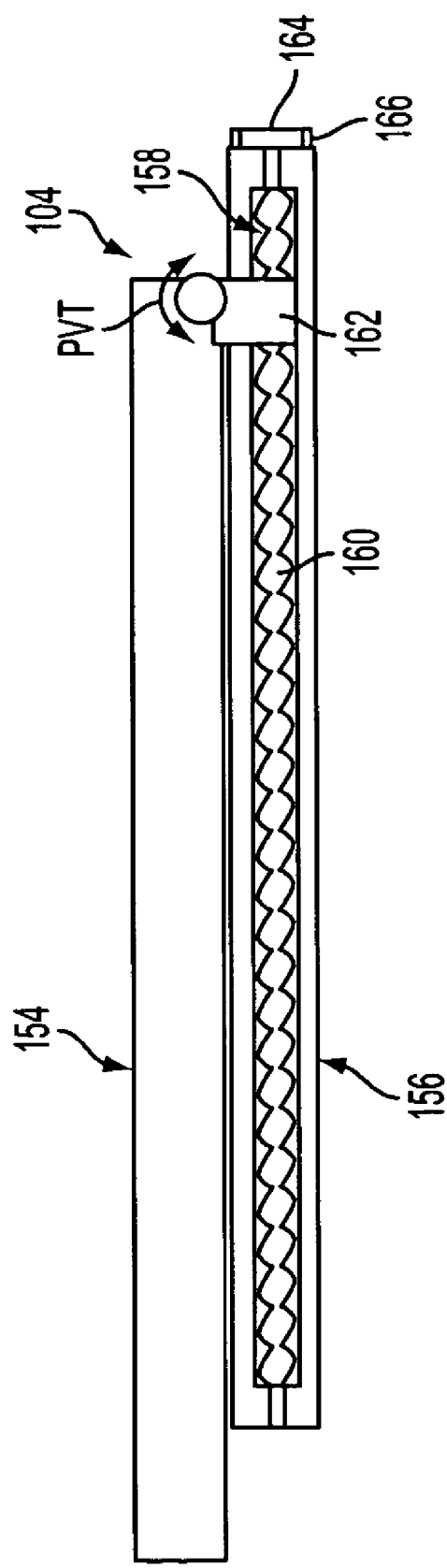
FIG. 6 is a cross-sectional side view of the platform in FIGS. 1-3 and 5 taken along line 6-6 in FIG. 2.
Figure 7:
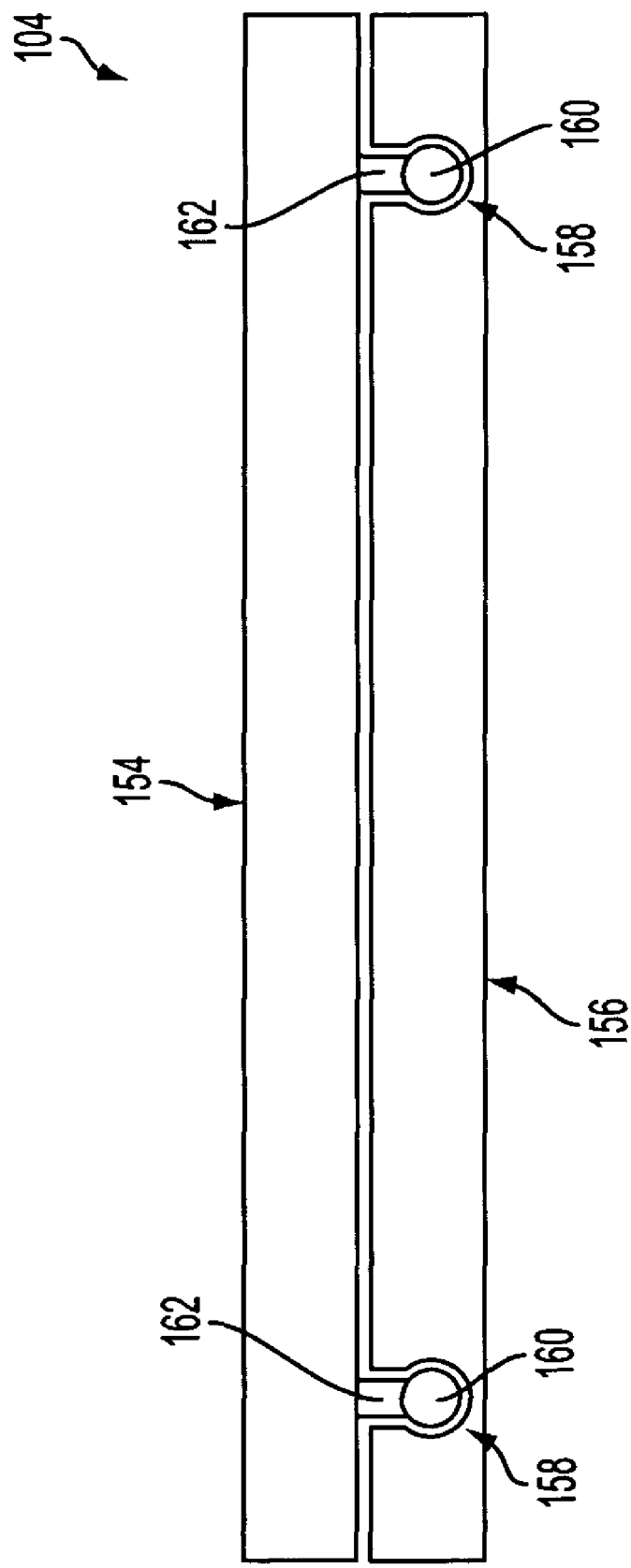
FIG. 7 is a cross-sectional front view of the platform in FIGS. 1-3, 5 and 6 taken along line 7-7 in FIG. 3.

As mentioned above, one or more actuators or actuating devices can be used to move upper platform 154 between a first or retracted position and a second or extended position. If a single actuating device is used, one more linear motion bearings (not shown) or other suitable components or arrangements, such as a dovetail and slideway, for example, can optionally be used to provide smooth travel of the upper platform and to maintain alignment thereof during such motion. Alternately, if two actuating devices are used, as shown in FIGS. 5-7, the same can be operatively interconnected for substantially synchronous operation. This can be accomplished in any suitable manner, such as by using independent drive motors (not shown) that are operated under coordinated control, for example. As another example, a timing pulley 164 can be secured on an end of each threaded member 160 and the timing pulleys can be interconnected using a timing belt 166 or another suitable component. In this arrangement, a single drive motor (not shown) can be used to substantially synchronously rotate the threaded members. Additionally, it will be appreciated that any other suitable device, system or a combination thereof can alternately be used as actuating devices, such as pneumatic or hydraulic cylinders, belt drives or a linear electric motor, for example.

Turning now to FIGS. 8-10, one example of a suitable support device is shown herein as flexible force transmission device 106. It will be appreciated that flexible force transmission device 106 can be of any construction or configuration, and can be of any suitable length. In the present exemplary embodiment, the flexible force transmission member is formed from a plurality of track segments or links 168 and it will be appreciated that the number and size of the track links will largely establish the length of device 106. Each of the track links includes one or more engaging features 170 that are preferably complimentary to other provided engaging features, such as the engaging features (e.g., teeth 144) on engaging disk 140, for example. Each track link is hingedly interconnected to at least one adjacent track link in a suitable manner, such as by using hinge pins 172, for example.

Figure 11:
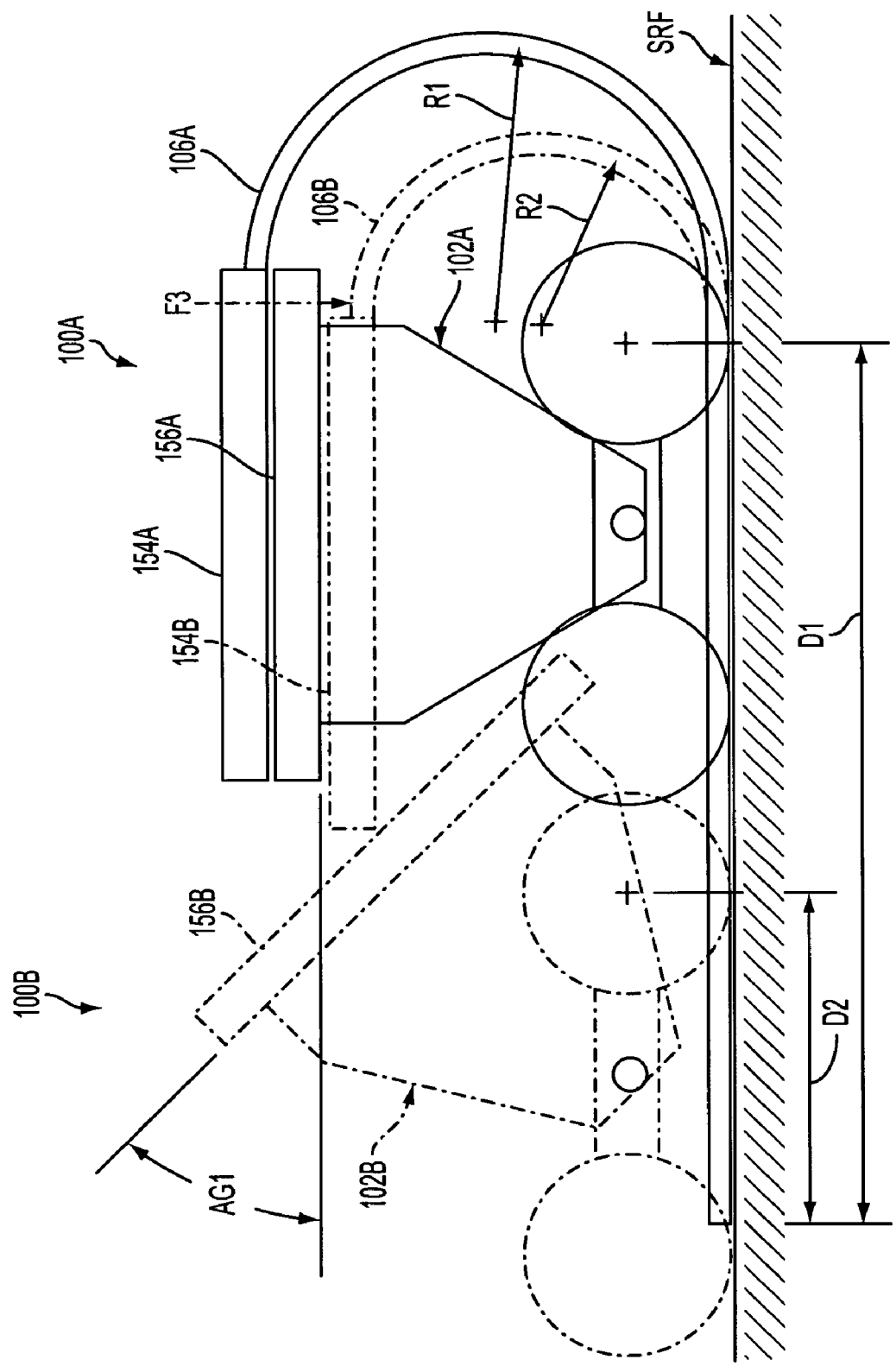
FIG. 11 is a schematic representation of movements of a vehicle base, a platform and a support device.

To effectively assist in supporting platform 154, it is desirable for device 106 to be flexible but not unstable when under a compressive or column loading condition. As such, the track links are adapted such that the interconnection therebetween permits the track to flex or roll-up in one direction, such as is shown in FIG. 8, but to generally resist hinged movement in an opposing direction. As such, a load or force F1 applied in one direction to the flexible force transmission assembly can cause the same to flex as shown in FIG. 8, but remained substantially rigid against a load or force F2 applied in an opposing direction. Furthermore, to remained capable of providing vertical support or carrying a load or force F3 in a vertical direction as shown in FIG. 11, track links 168 include contact surfaces 174 that engage the adjacent track links and limit the movement therebetween. It will be appreciated that the configuration (e.g., height, width and angle) of the contact surfaces will vary from application to application, and that one of skill in the art will be capable of determining a suitable configuration or arrangement for the contact surfaces.

FIG. 11 illustrates a transport vehicle in a generally upright, transport orientation, as represented by item number 100A, and the transport vehicle in an intermediate orientation, as represented by item number 100B, as the same is moving toward an angled, transfer orientation. Numerous actions or movements can be recognized from FIG. 11. For example, vehicle base 102A is shown as being generally upright, whereas vehicle base 102B is disposed at an angle AG1. As the vehicle base is rotated, platform 154A remains substantially horizontal as indicated by item number 154B. However, the platform is displaced from a first or retracted position relative to platform 156A to an intermediate position relative to platform 156B. Additionally, as platform 154 moves increasingly closer to surface SRF the radius R1 of flexible force transmission device 106A decreases to a radius R2 of device 106B. To accommodate this change, the vehicle base moves relative to the flexible force transmission device as indicated by distance dimensions D1 and D2 respectively associated with vehicle bases 102A and 102B.

Figure 12:
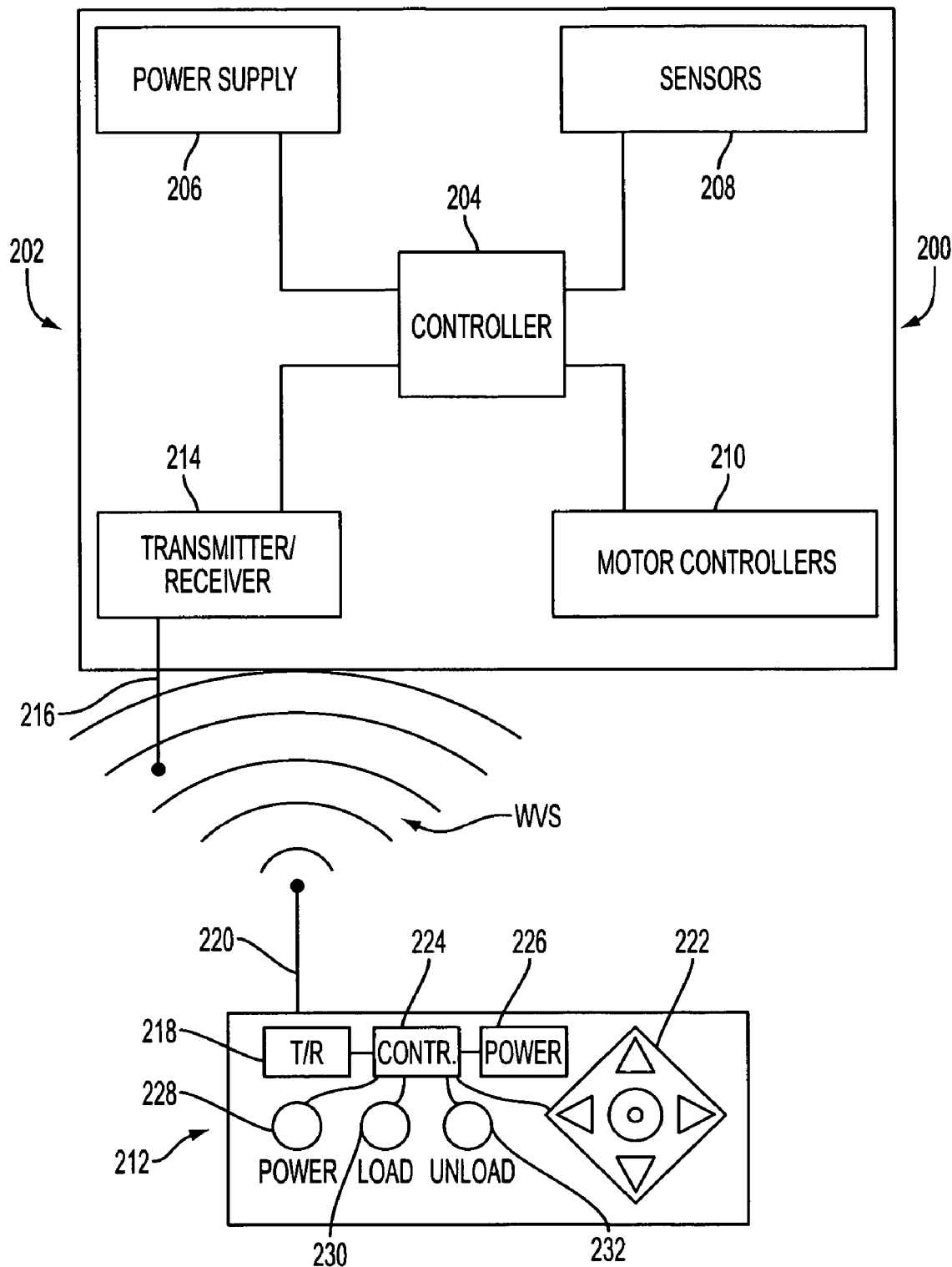
FIG. 12 is a schematic representation of one exemplary embodiment of a control system suitable for operating a transport vehicle.

One example of a control system for a transporter according to the present disclosure is schematically represented in FIG. 12 as control system 200, which includes a base control system 202 that is supported on the vehicle base. Base control system 202 includes a controller 204 and a power source 206 in communication with the controller. Additionally, a sensor input interface 208 and a motor control interface 210 are in communication with controller 204. It will be appreciated that self-balancing devices, such as the IBOT Mobility System discussed above, include substantially sophisticated motion control systems that utilize sensor feedback and software algorithms to control the motion and balancing of the device. As such, one of skill in the art, having been made aware of the present disclosure, would be capable of generating or revising any software algorithms to provide control of the vehicle base and platform as discussed herein.

Additionally, control system 200 includes a remote control for providing operator control of the transporter at a distance from the same. Such a remote control can include a wired control panel (not shown) of a suitable kind, type or configuration. Alternately, control system 200 can include a wireless remote control 212 that is adapted to communicate with base control system 202 in a suitable manner. For example, base control system 202 can include a transmitter/receiver 214 that has an antenna 216 for broadcasting and receiving suitable communication signals. Remote control 212 can include a corresponding transmitter/receiver 218 and an antenna 220 for communicating with base control system 202. Transmitter/receiver 210 and transmitter/receiver 218 can be operable in any suitable manner, such as by broadcasting and receiving electromagnetic signals or waves WVS, such as IR or RF waves, for example. Additionally, signal encoding schemes (e.g., phase-shift keying or frequency-shift keying) can optionally be used for communicating between base control system 202 and wireless remote control 212.

Remote control 212 can also include a directional control pad 222 or other suitable input control that is in communication with a second controller 224. A power supply 226 is in electrical communication with controller 224, which outputs signals corresponding to control inputs to transmitter/receiver 218. Other input controls can include a power switch 228, and load and unload buttons 230 and 232, for example.

Figure 13:
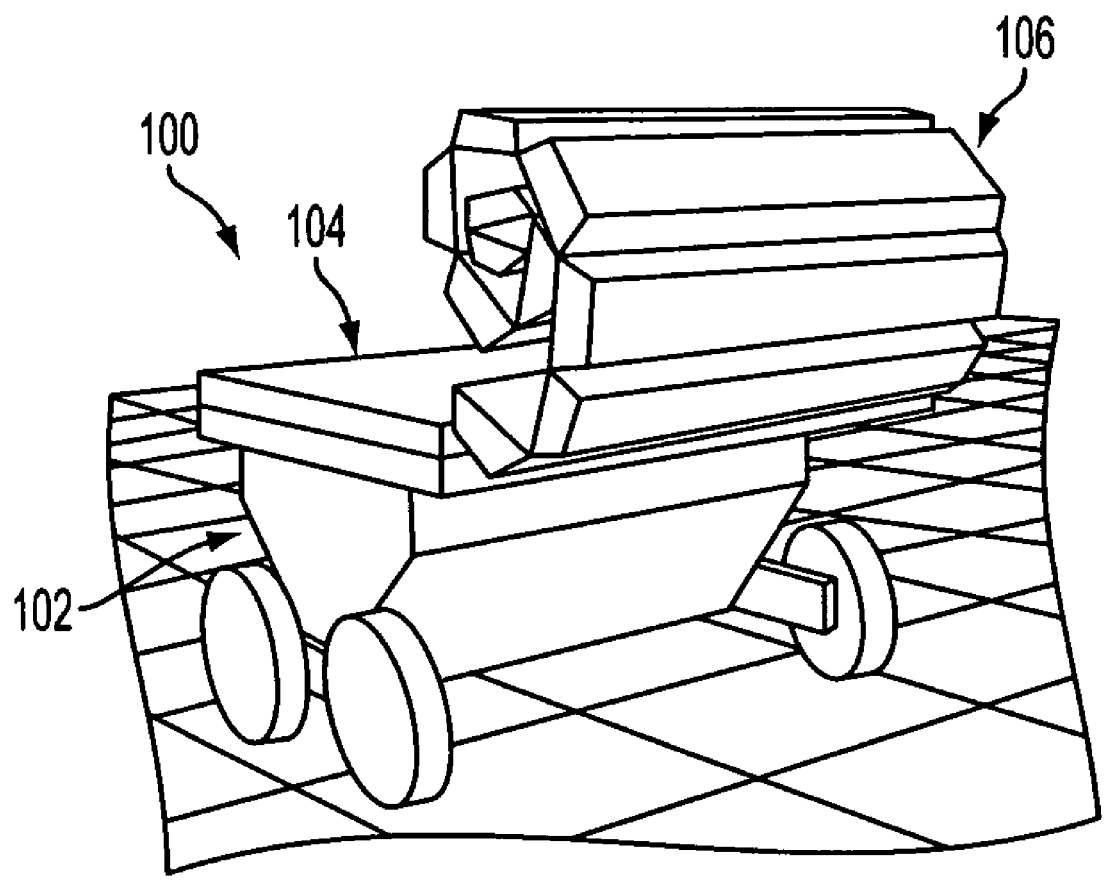
FIGS. 13-21 illustrate a transfer operation of an associated cargo on a vehicle base, a platform and a support device.
Figure 14:
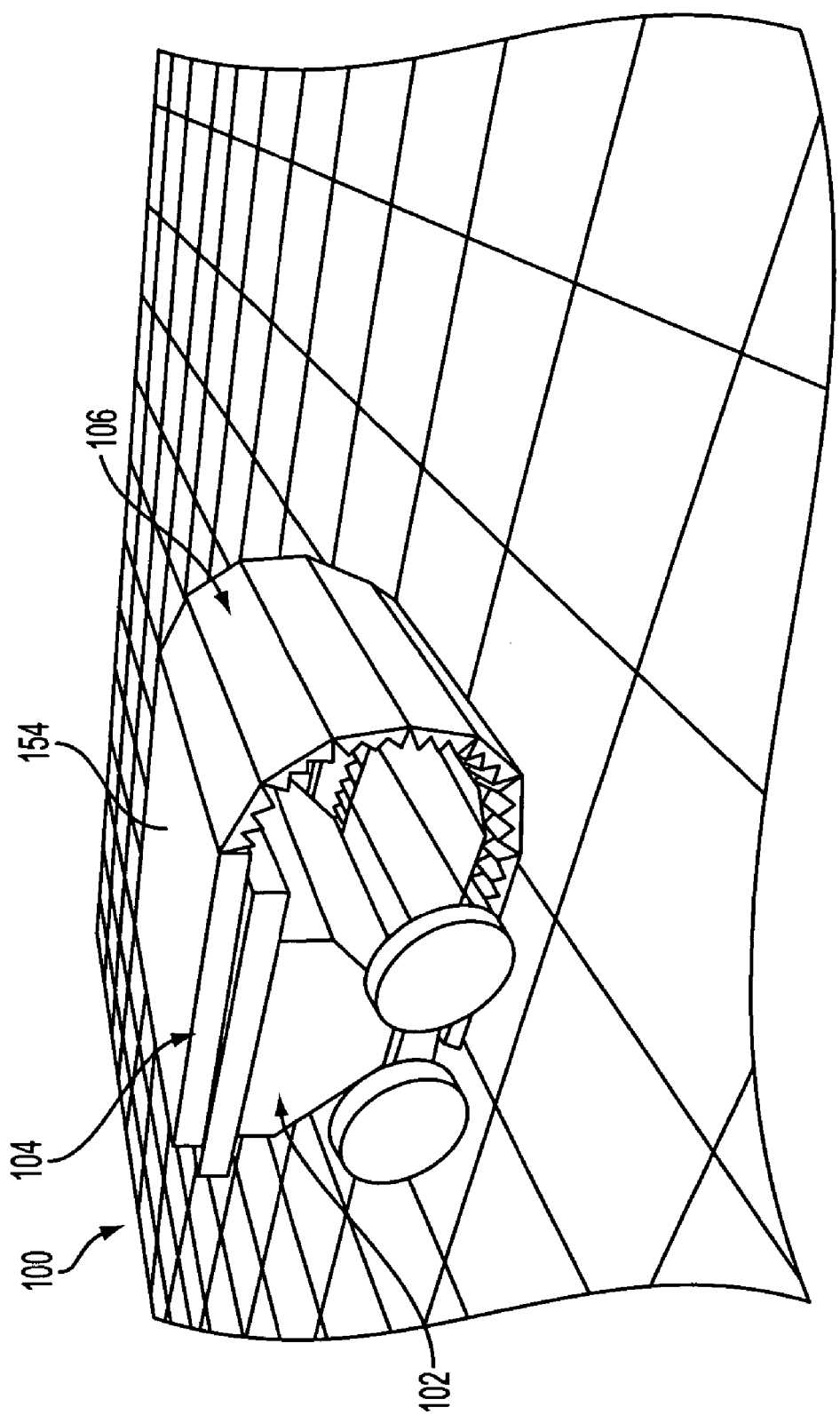
Figure 15:
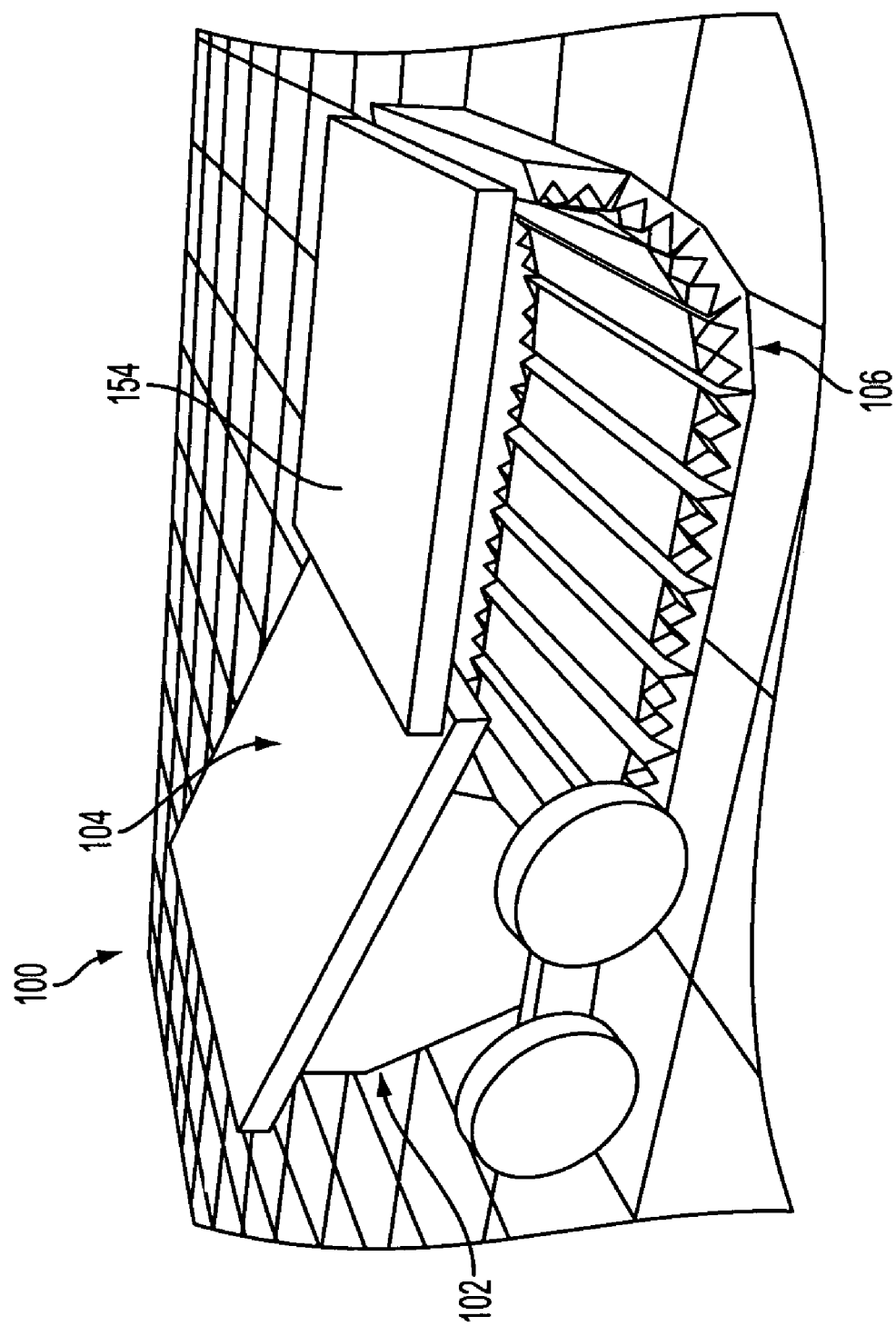

FIGS. 13-21 illustrate a transfer operation for transporter 100, such as loading or unloading an associated cargo CGO on to or off of a platform, such as platform assembly 104, for example, of a vehicle base, such as vehicle base 102. In FIG. 13, an unladen transporter 100 is provided that includes a vehicle base 102, a platform assembly 104 supported on the vehicle base, and a support device, such as a flexible force transmission device 106, for example. In FIG. 14, device 106 has been unrolled and placed in operative association with an engaging member provided on vehicle base 102. Additionally, platform 154 of platform assembly 104 is moving from a first or retracted position in FIG. 13 toward a second or extended position. In FIG. 15, platform 154 has nearly reached the extended position. It will be recognized that platform 154 remains approximately horizontally disposed as the platform moves between the retracted and extended positions. Additionally, vehicle base 102 has moved from a generally upright orientation in FIGS. 13 and 14 into a significantly more angled orientation in FIG. 15. Furthermore, vehicle base 102 has moved or been repositioned relative to device 106, as shown in and discussed with regard to FIG. 11.

Figure 16:
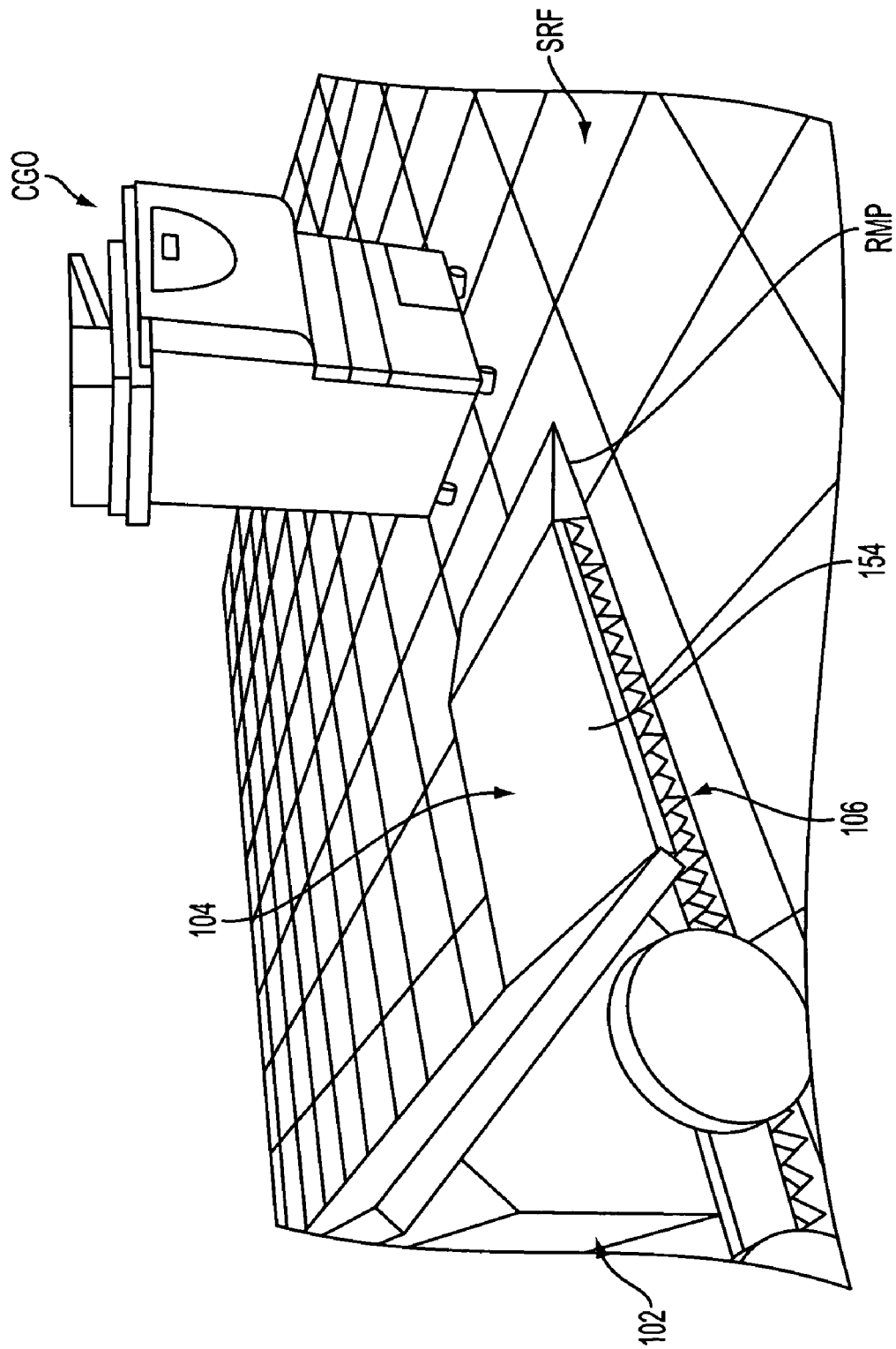
Figure 17:
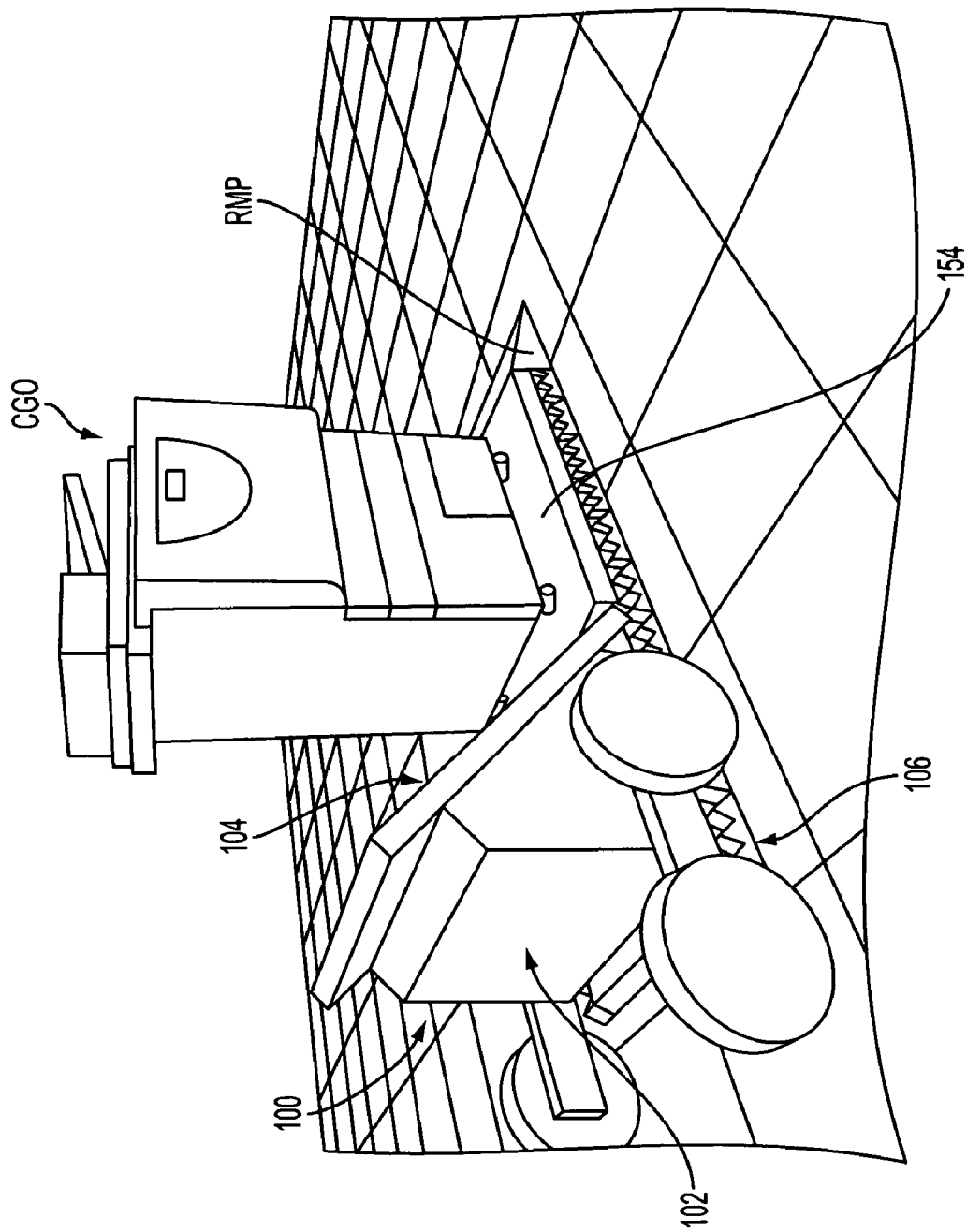

In FIG. 16, vehicle base 102 has reached a second or angled orientation, and platform 154 of platform assembly 104 has reached a fully extended position. Device 106 is extending substantially horizontally along surface SRF and platform 154 is supported directly thereon. As such, platform 154 is disposed in an appropriate orientation or position for the loading or unloading of an associated payload, such as cargo CGO. A ramp RMP or other component can optionally be used to minimize impact or other inputs on the associated cargo, which is shown loaded on platform 154 in FIG. 17.

Figure 18:
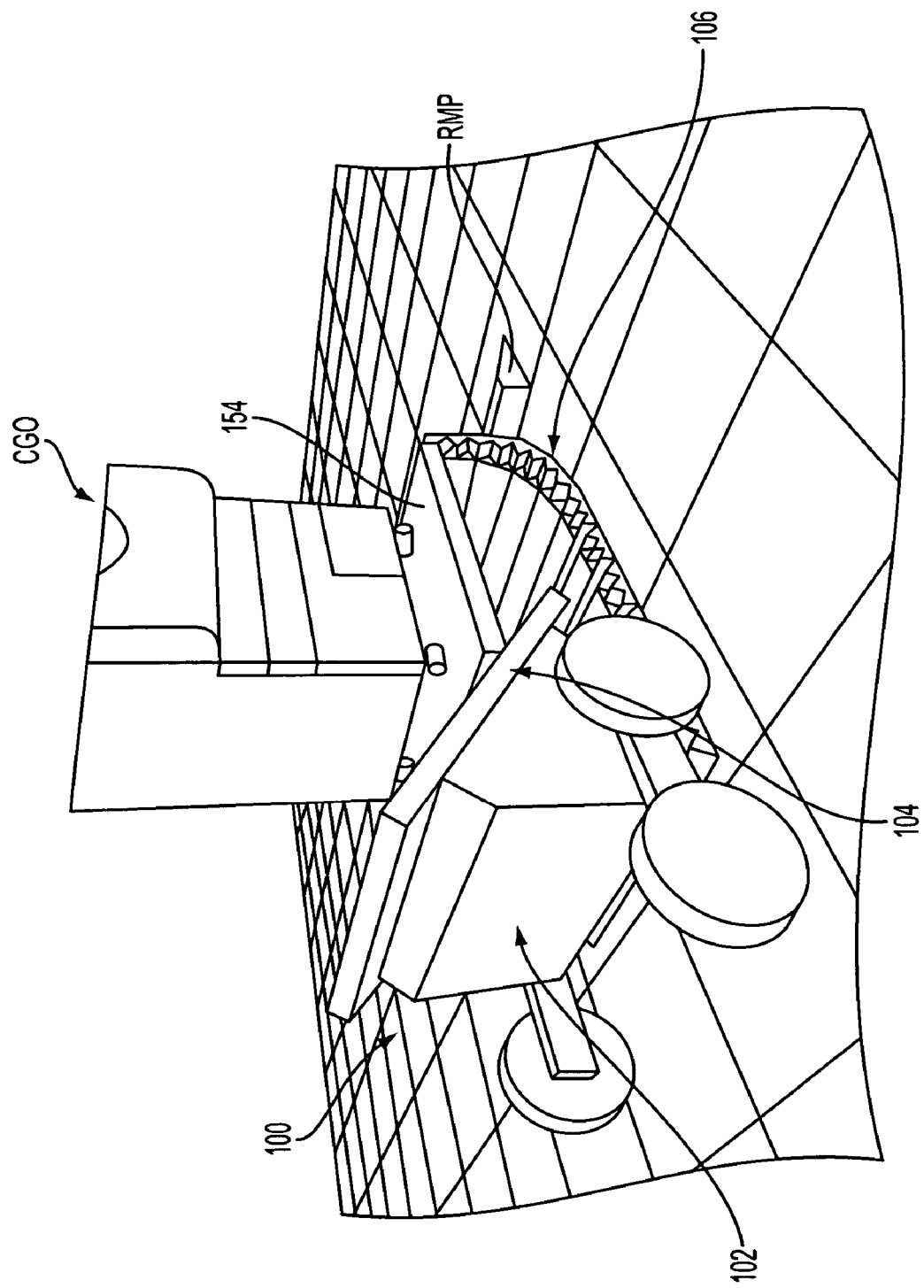
Figure 19:
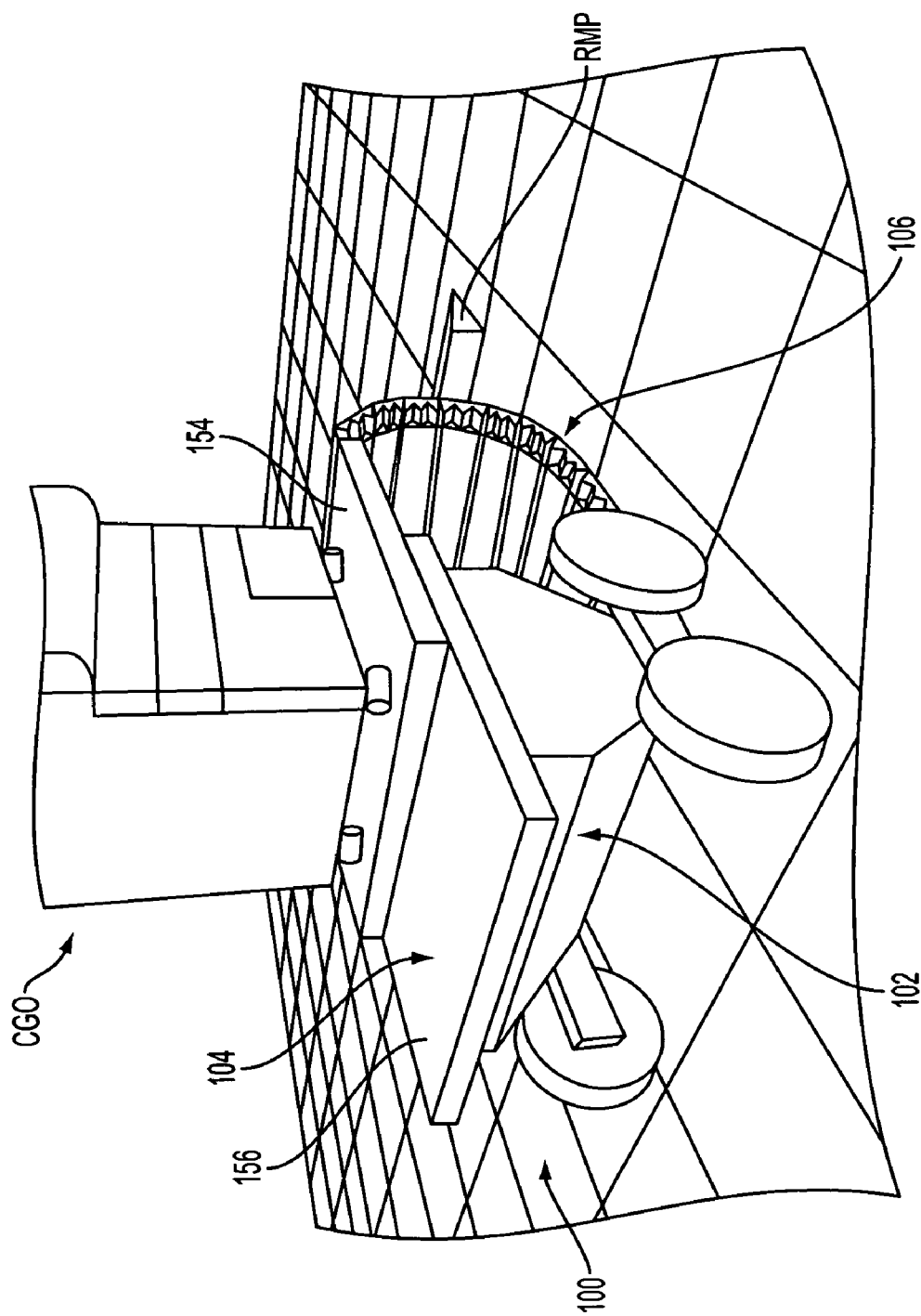
Figure 20:
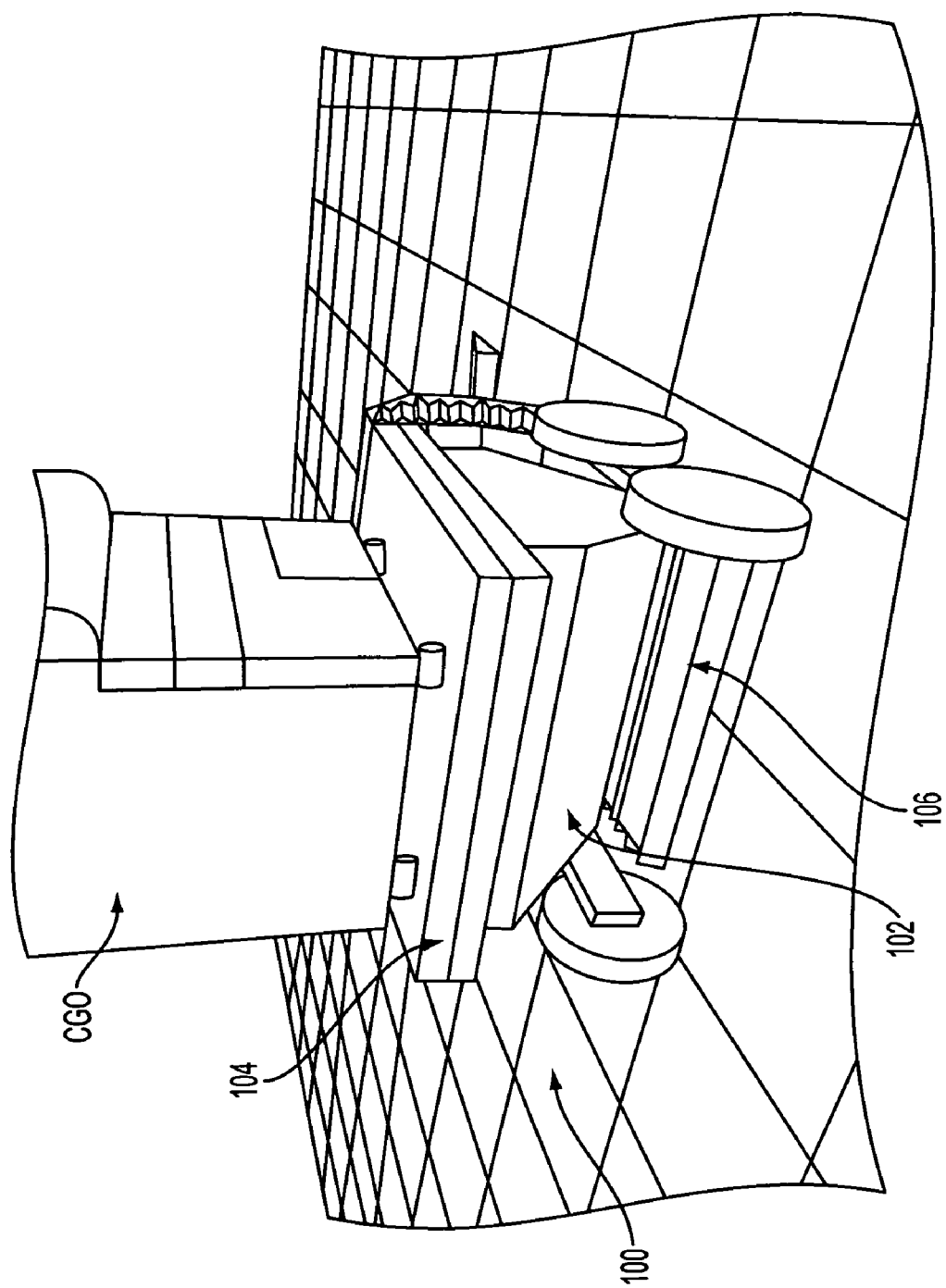
Figure 21:
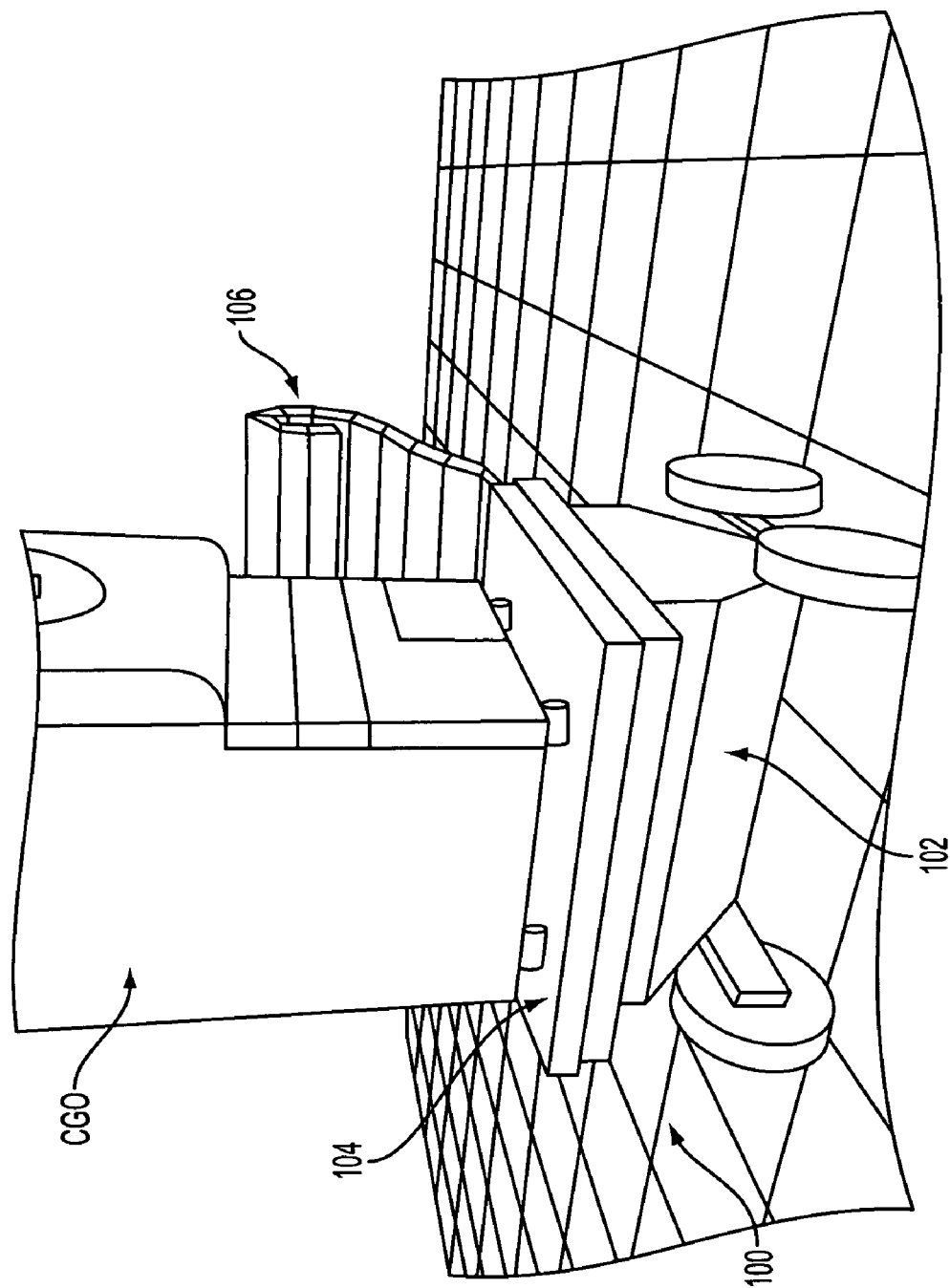

In FIGS. 18-20, vehicle base 102 returns from a second or angular orientation to the first or upright orientation suitable for transporting cargo CGO. Additionally, platform 154 of platform assembly 104 remains approximately horizontal during the move from the extended position in FIG. 17 to the retracted position in FIG. 20. Furthermore, it will be appreciated that cargo CGO also remains substantially upright and that the tipping or tilting of the cargo that is associated with other transport methods is avoided. Vehicle base 102 can be moved relative to device 106 to lengthen or shorten the load transmitting distance. In FIG. 21, the vehicle base 102 and platform assembly 104 are fully returned to the orientation and/or position suitable for transport of the cargo, and device 106 has been removed from engagement with the vehicle base. As such, transporter 100 can be operated to transport the associated cargo.

Figure 22:
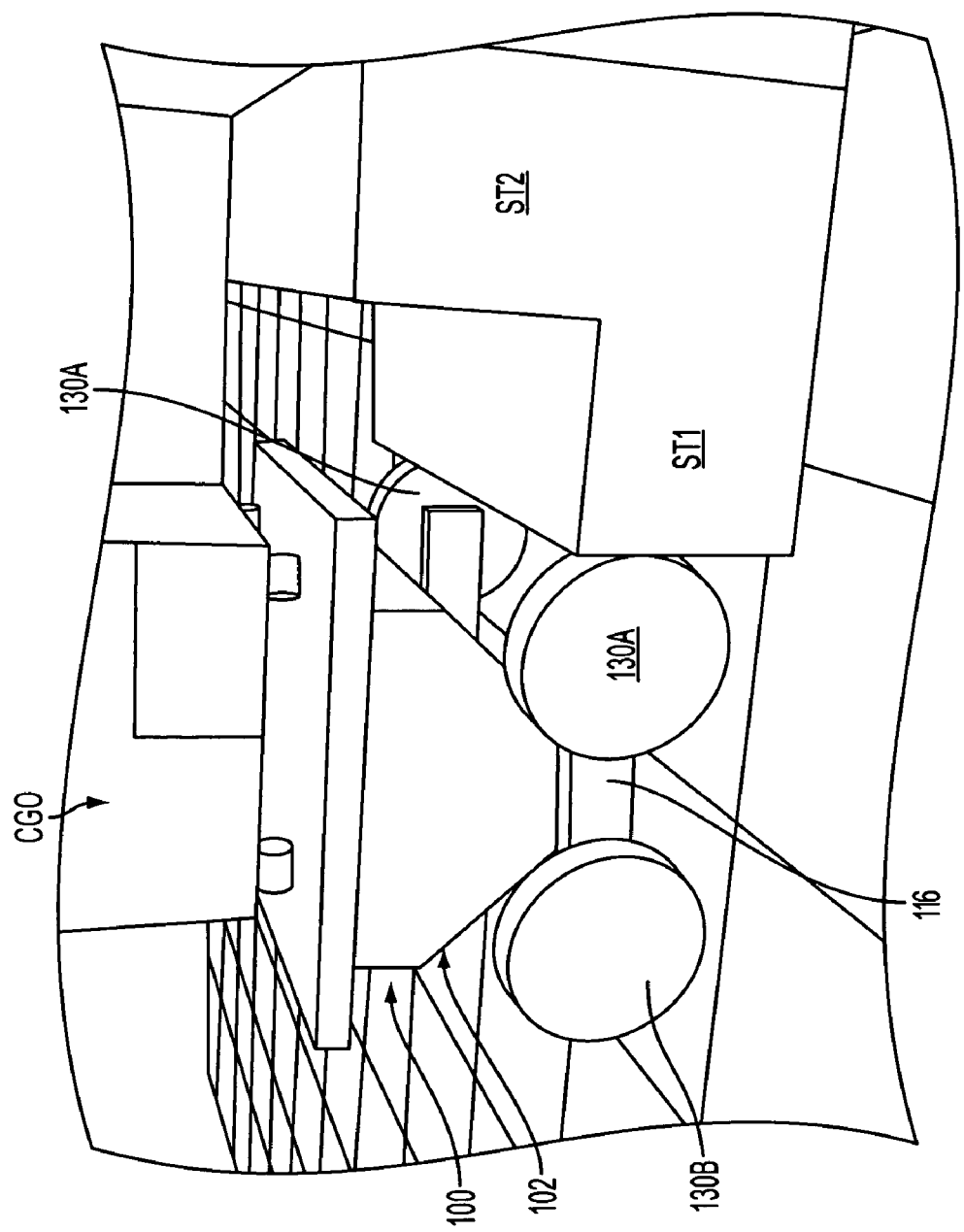
FIGS. 22 and 23 illustrate a transporter and associated payload traversing a discontinuous surface.
Figure 23:
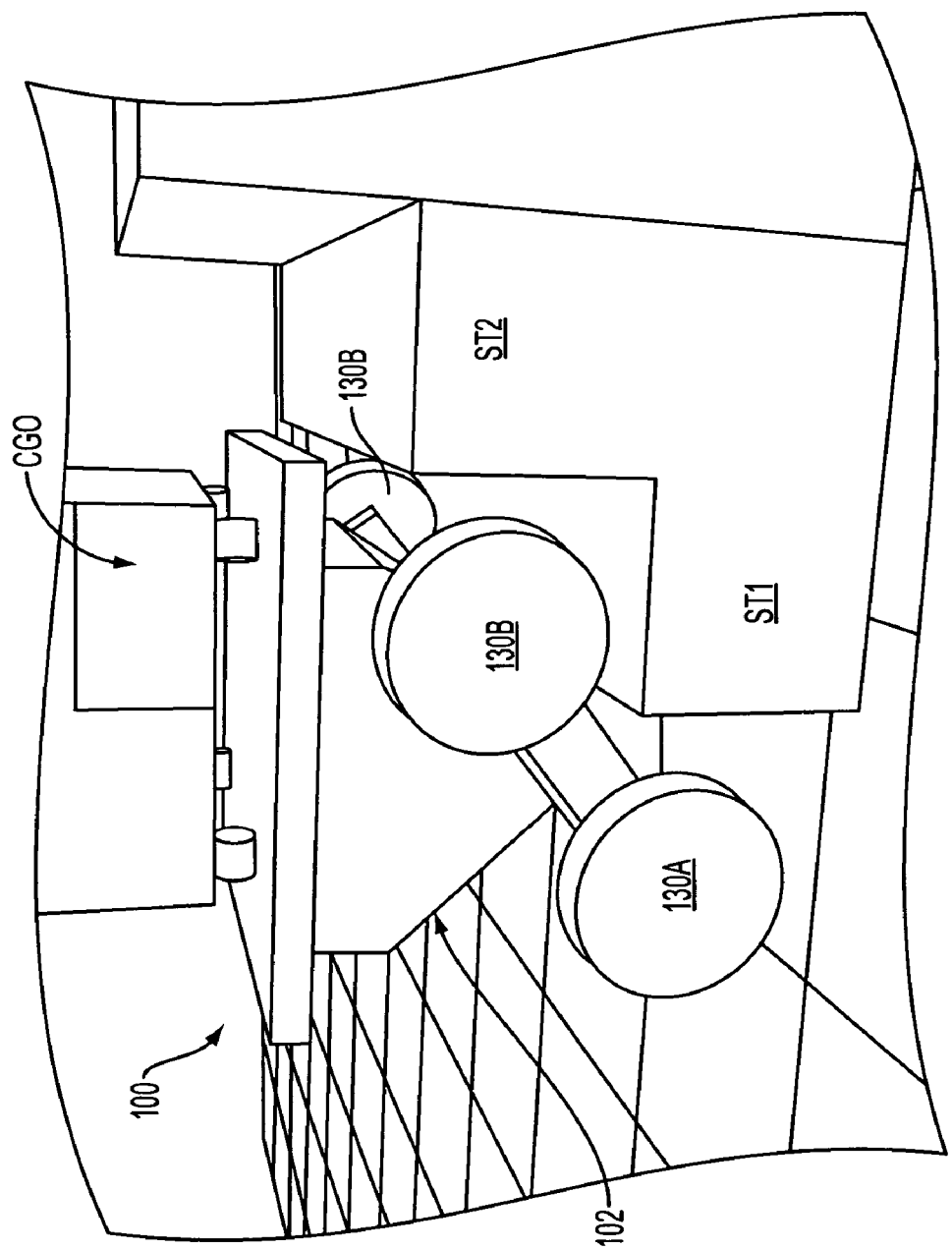

FIGS. 22 and 23 illustrate transporter 100 laden with cargo CGO traversing a discontinuous surface, such as a flight of stairs that includes steps ST1 and ST2. Upon contacting the front of stair ST1, carrier members 116 of vehicle base 102 are rotated about wheels 130A until wheels 130B contact the tread of stair STI and can support the transporter and cargo thereon. This process is repeated for stair ST2 and continues to ascend the full flight of stairs. Additionally, these same actions can be performed in reverse to descend a flight of steps. Similar actions can be used to traverse a wide variety of discontinuous surfaces. Importantly, platform assembly 104 remains in a substantially horizontal orientation during the movements of the transporter. As such, cargo CGO does not undergo the tipping or tilting actions associated with other transport methods.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A transport vehicle capable of displacement between a first condition for transferring an associated cargo and a second condition for transporting the associated cargo, said transport vehicle comprising:
    a self-balancing vehicle base including a carrier structure having a balancing axis, a ground-engaging component operatively connected to said carrier structure, and a base structure rotatably supported on said carrier structure for displacement about said balancing axis between a first orientation corresponding to said first condition of said transport vehicle and a second orientation that is different from said first orientation and corresponds to said second condition of said transport vehicle;
    a platform moveably supported on said vehicle base and displaceable relative thereto in a direction transverse to said balancing axis between a first position corresponding to said first orientation of said vehicle base and a second position corresponding to said second orientation of said vehicle base, said platform including a first end pivotally connected to said base structure and a second end spaced from said first end in said direction transverse to said balancing axis, said second end being free from said base structure such that said platform can be maintained in an approximately fixed orientation during displacement of said base structure between said first and second orientations; and,
    a support device engaging said second end of said platform and supporting at least a portion thereof during displacement between said first position and said second position such that said platform can be maintained in said approximately fixed orientation during displacement of said base structure between said first and second orientations; wherein a free end of said support device travels beneath at least a portion of said base structure.

2. A transport vehicle according to claim 1 further comprising a control system operative to control movement of said self-balancing vehicle base and displacement of said platform.

3. A transport vehicle according to claim 2, wherein said control system includes a base control system disposed on said base and a remote control device in communication with said base control system.

4. A transport vehicle according to claim 3, wherein said remote control device is a wireless remote control device.

5. A transport vehicle according to claim 1, wherein said support device is a flexible force transmitting device operative to transmit a force between said platform and said vehicle base.

6. A vehicle for transporting an associated cargo over a discontinuous surface, said transport vehicle comprising:
    a self-balancing vehicle base operative to traverse a discontinuous surface and displaceable between a first condition for transporting the associated cargo and a second condition for transferring the associated cargo, said vehicle base including a carrier structure having an axis, a ground-engaging component operatively connected to said carrier structure, and a base structure rotatably supported on said carrier structure for displacement relative thereto about said axis between a first orientation corresponding to said first condition of said vehicle base and a second orientation corresponding to said second condition of said vehicle base;
    a platform moveably supported on said vehicle base for receiving the associated cargo, said platform displaceable in a direction transverse to said axis between a retracted position for transporting the associated cargo and an extended position for transferring the associated cargo, said platform including a first end pivotally connected to said base structure and a second end spaced from said first end in said direction of displacement, said second end being free from said base structure such that said platform can be maintained in an approximately fixed orientation during displacement of said base structure between said first and second orientations; and,
    a support member operatively connected between said vehicle base and said second end of said platform, said support member operative to support said second end of said platform during displacement of said platform between said retracted position and said extended position such that said platform can be maintained in said approximately fixed orientation during displacement of said base structure between said first and second orientations; wherein a free end of said support member travels beneath at least a portion of said base structure.

7. A vehicle according to claim 6, wherein said base structure has opposing sides with said axis extending between said opposing sides, said carrier structure includes first and second carrier members having opposing ends and supported on said opposing sides of said base structure for driveable rotation of said base structure about said axis, and said ground-engaging component includes a pair of wheels supported on opposing ends of each of said carrier members.

8. A vehicle according to claim 7 further comprising an endless drive track extending around said pair of wheels on each of said first and second carrier members.

9. A vehicle according to claim 6, wherein said vehicle base is approximately upright in said first orientation and said vehicle base is disposed at an angle in said second orientation.

10. A vehicle according to claim 9, wherein said approximately fixed orientation of said platform is approximately horizontal in said retracted position and remains approximately horizontal during displacement between said retracted position and said extended position.

11. A transport vehicle capable of displacement between a first condition for transferring an associated payload having an associated orientation and a second condition for transporting the associated payload in the associated orientation, said transport vehicle being capable of traversing a plurality of stairs carrying the associated payload while maintaining the associated payload in the associated orientation, said transport vehicle comprising:

a self-balancing vehicle base including:
a base structure including an upper end wall, opposing sides, an axis extending between said opposing sides, a base axle extending along said axis, and a motor in operative association with said base axle;
first and second carrier members supported along said opposing sides of said base structure such that said base structure can be rotated about said axis relative to said first and second carrier members, at least one of said first and second carrier members being operatively connected to said base axle such that rotation of said base structure with respect to said first and second carrier members can be selectively controlled, said first and second carrier members having opposing ends and a wheel axle supported on each of said opposing ends;
a wheel assembly supported on each of said wheel axles;
a rotational motion source operatively connected between said base structure and said first and second carrier members; and,
a control system in electrical communication with said rotational motion source and operative to selectively energize said rotational motion source to:
1) displace said base structure into a first alignment corresponding to said first condition of said transport vehicle in which said upper end wall of said base structure is disposed at a non-zero angle relative to horizontal;
2) displace said base structure into a second alignment corresponding to said second condition of said transport vehicle in which said upper end wall of said base structure is disposed approximately horizontally; and,
3) maintain said base structure in approximately said second alignment during traversal of a plurality of stairs;
a platform moveably supported along said upper end wall of said vehicle base and displaceable in a direction transverse to said axis between a first position and a second position, said platform including a first end pivotally connected to said base structure and a second end spaced from said first end in said direction transverse to said axis, said second end being free from said base structure such that said platform can be maintained in an approximately horizontal orientation during displacement of said base structure between said first and second orientations; and,
a flexible force transmitting device connected to said second end of said platform and adapted to engage said vehicle base such that said platform can be maintained in said approximately horizontal orientation during displacement of said base structure between said first and second alignments; wherein a free end of said flexible force transmitting device travels beneath at least a portion of said base structure.

12. A transport vehicle according to claim 11, wherein said flexible force transmission assembly includes a plurality of track segments hingedly connected to one another.

13. A transport vehicle according to claim 12, wherein said wheel assembly includes a wheel, an engagement member rotatably supported adjacent said wheel, and a keying device selectively engagable between said wheel and said engagement member.

14. A transport vehicle according to claim 13, wherein each of said track segments includes a first engagement feature, and said engagement member includes a second engagement features complementary to said first engagement feature.

15. A transport vehicle according to claim 14, wherein said first and second engagement features each include a plurality of complementary gear teeth.

16. A transport vehicle according to claim 11 further comprising an actuator operative to displace said support platform between said retracted and said extended position.

17. A transport vehicle according to claim 16, wherein said actuator includes a threaded member rotatably supported on said vehicle base and a travel nut displaceably received on said threaded member and engaging said platform.

18. A transport vehicle according to claim 17, wherein said platform is pivotally connected to said travel nut.

19. A transport vehicle capable of traversing a plurality of stairs carrying an associated payload, said transport vehicle comprising:
a self-balancing vehicle base including a base structure having opposing sides, an axis extending between said opposing sides, a base axle extending along said axis, and a motor in operative association with said base axle;
first and second carrier members supported along said opposing sides of said base structure for rotation about said axis, at least one of said first and second carrier members being operatively associated with said base axle, said first and second carrier members having opposing ends and a wheel axle supported on each of said opposing ends;
a wheel assembly supported on each of said wheel axles, said wheel assembly including a wheel, an engagement member rotatably supported adjacent said wheel, and a keying device selectively engagable between said wheel and said engagement member, said keying device including a spring-biased keying member, said engagement member including a passage adapted to receive a portion of said keying member and thereby prevent relative rotation between said wheel and said engagement member;
a platform supported on said vehicle base and displaceable between a first position and a second position; and,
a flexible force transmitting device supportable on said platform and adapted to engage one of said vehicle base or at least one of said wheel assemblies on one of said first and second carrier members, said flexible force transmitting device including a plurality of track segments hingedly connected to one another.

20. A method of transporting a payload comprising:
a) providing transport vehicle that includes:
- a self-balancing vehicle base operative to traverse a discontinuous surface and displaceable between a first condition for transporting the associated cargo and a second condition for transferring the associated cargo, said vehicle base including a carrier structure having an axis, a ground-engaging component operatively connected to said carrier structure, and a base structure rotatably supported on said carrier structure for displacement relative thereto about said axis between a first angular orientation corresponding to said first condition of said vehicle base and a second angular orientation corresponding to said second condition of said vehicle base;
- a displaceable platform moveably supported on said vehicle base for receiving the payload, said platform displaceable in a direction transverse to said axis between a retracted position for transporting the payload and an extended position for transferring the payload, said platform including a first end pivotally connected to said base structure and a second end spaced from said first end in said direction of displacement, said second end being free from said base structure such that said platform can be maintained in an approximately fixed orientation during displacement of said base structure between said first and second orientations, and,
- a support device operatively connected between said vehicle base and said second end of said platform, said support device operative to support said second end of said platform during displacement of said platform between said retracted position and said extended position such that said platform can be maintained in said approximately fixed orientation during displacement of said base structure between said first and second orientations;

b) moving said vehicle base from said first angular orientation to said second angular orientation;
c) moving said platform from said retracted position to said extended position;
d) transferring the payload to or from said platform;
e) returning said platform to said retracted position; and,
f) returning said vehicle base to said first angular orientation; wherein a free end of said support device travels beneath at least a portion of said base structure.

21. A method according to claim 20 further comprising securing said support device on said platform, and engaging said a support device with said vehicle base.

22. A method according to claim 21 further comprising changing a force transmitting length of said support device extending between said platform and said vehicle base.

23. A method according to claim 22, wherein changing said force transmitting length includes displacing said vehicle base relative to said support device.

24. A method according to claim 20 further comprising moving said vehicle base from a first location to a second location.

25. A method according to claim 24, wherein moving said vehicle base includes traversing a discontinuous surface.

26. A method according to claim 20, wherein at least one of c) and e) includes maintaining said platform in an approximately horizontal orientation between said retracted and extended positions.

27. A method according to claim 20, wherein b) and c) are performed approximately simultaneously.

* * * * *